Figure 1A:
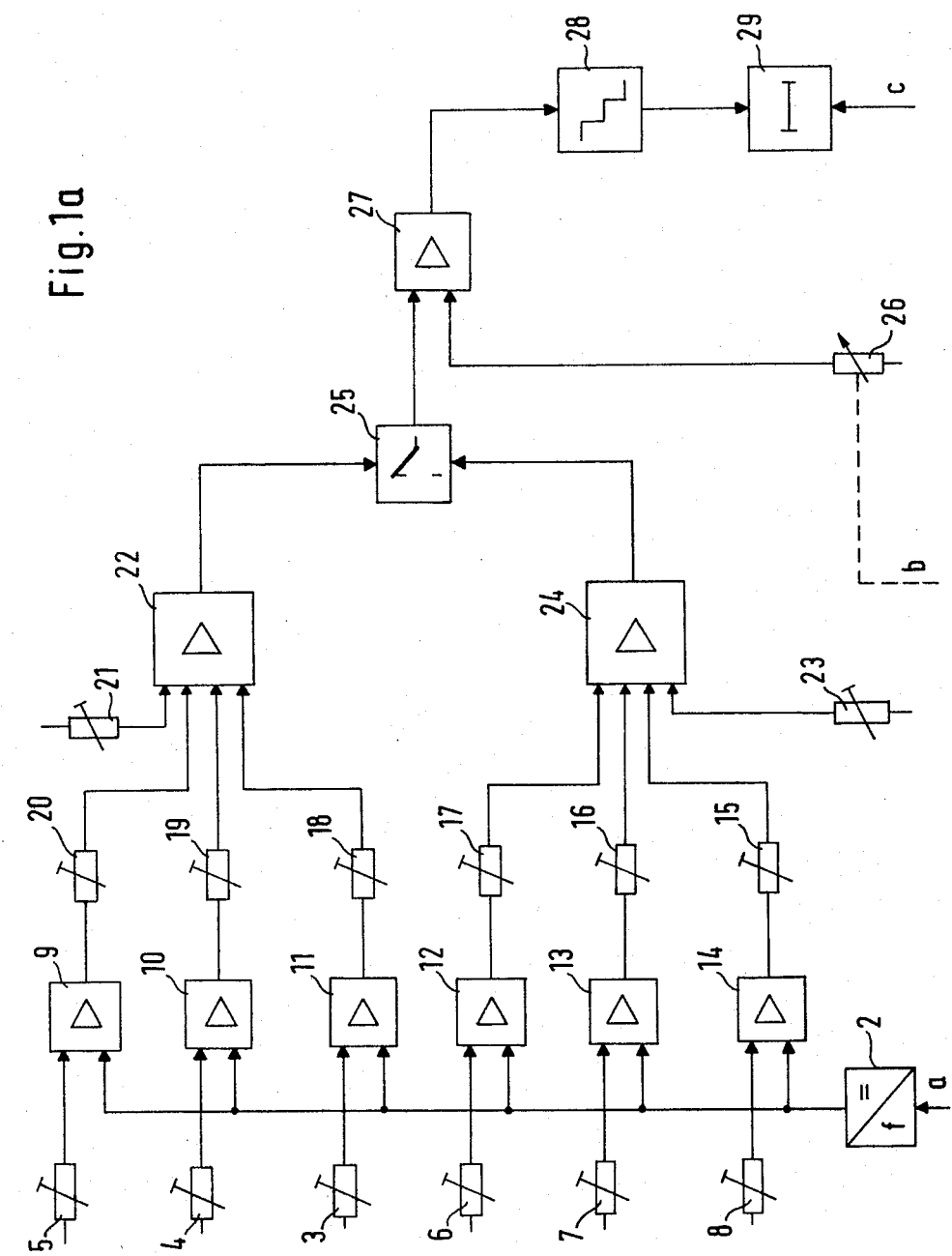

United States Patent [19]

Grebe

[11] 4,278,922

[45] Jul. 14, 1981

[54] ASSEMBLY FOR GENERATING ADJUSTMENT MOVEMENTS AT AUTOMOBILE VENTILATION DEVICES

[75] Inventor: Karl Grebe, Frankfurt, Fed. Rep. of Germany

[73] Assignee: Rockwell-Golde, G.m.b.H., Frankfurt, Fed. Rep. of Germany

[21] Appl. No.: 28,931

[22] Filed: Apr. 11, 1979

[30] Foreign Application Priority Data

Apr. 20, 1978 [DE] Fed. Rep. of Germany ....... 2817297

[51] Int. Cl.³ ............................................. B60H 1/26
[52] U.S. Cl. .................................... 318/264; 296/223; 98/2.01; 98/2.14; 180/281; 180/289; 318/558
[58] Field of Search ................ 296/137; 98/2.01, 2.14; 180/281, 289; 318/264–266, 281, 282, 283, 286, 443, 446, 449, 450, 464, 478, 489, 558

[56] References Cited

U.S. PATENT DOCUMENTS 3,403,855  10/1968  Boothors et al. ................... 98/2.01

Primary Examiner—J. V. Truhe
Assistant Examiner—John W. Redman

[57] ABSTRACT

An assembly which is to be used for generating adjustment movements on automobile ventilation devices driven by electric motors. The assembly is especially designed for use on roof openings or sunroofs closeable by a lid. The assembly is characterized in that a generator is coupled to a component of the automobile which revolves during traveling and the rotational speed of which is directly proportional to the speed of travel. A control signal directly proportional to the speed of travel is obtained from the generator by means of which the adjustment drive for the ventilation device can be switched on according to the speed of travel. The adjustment drive can be switched on in the direction of closing the ventilation device at a higher speed and in the direction of opening at a lower speed.

6 Claims, 21 Drawing Figures

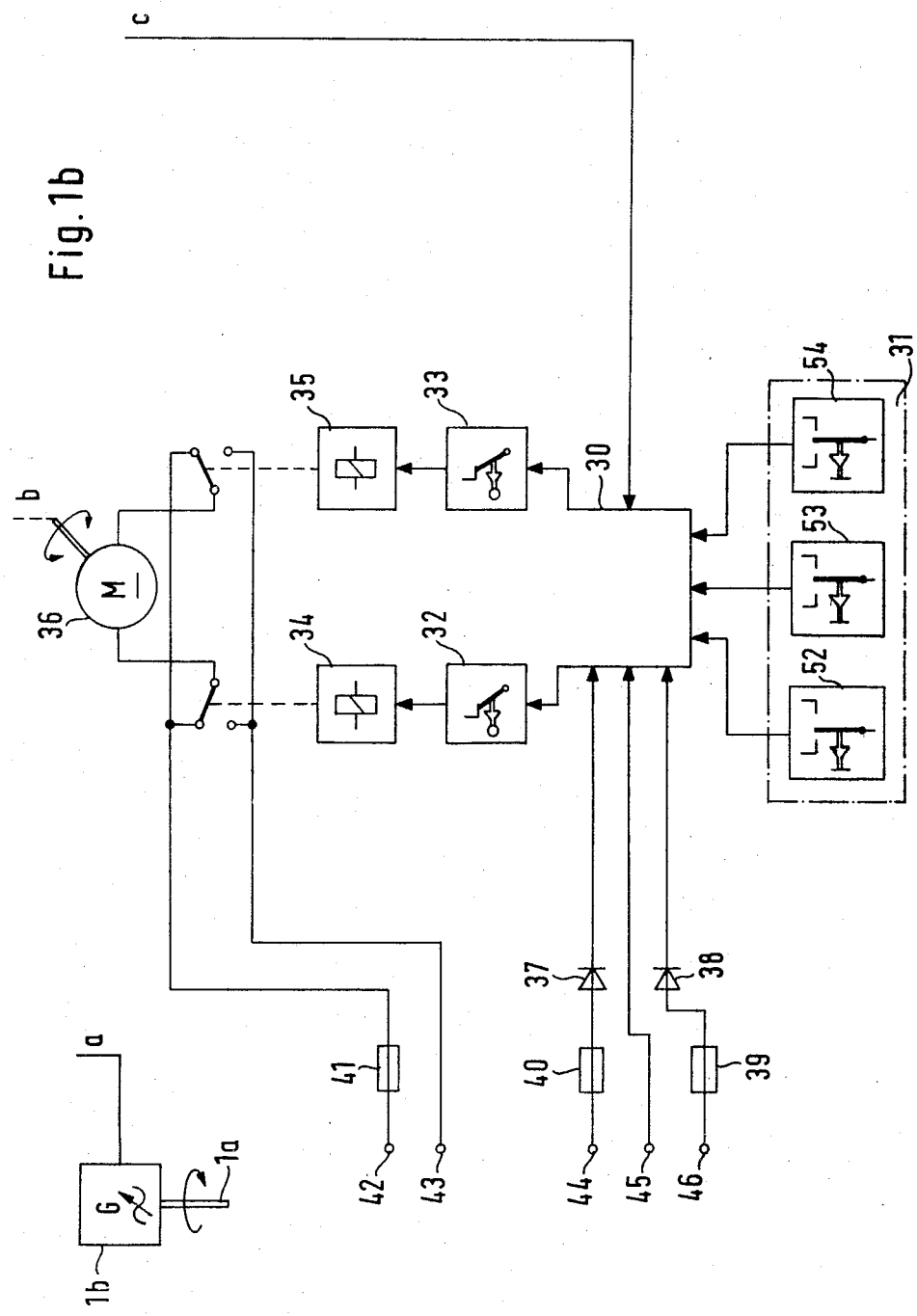

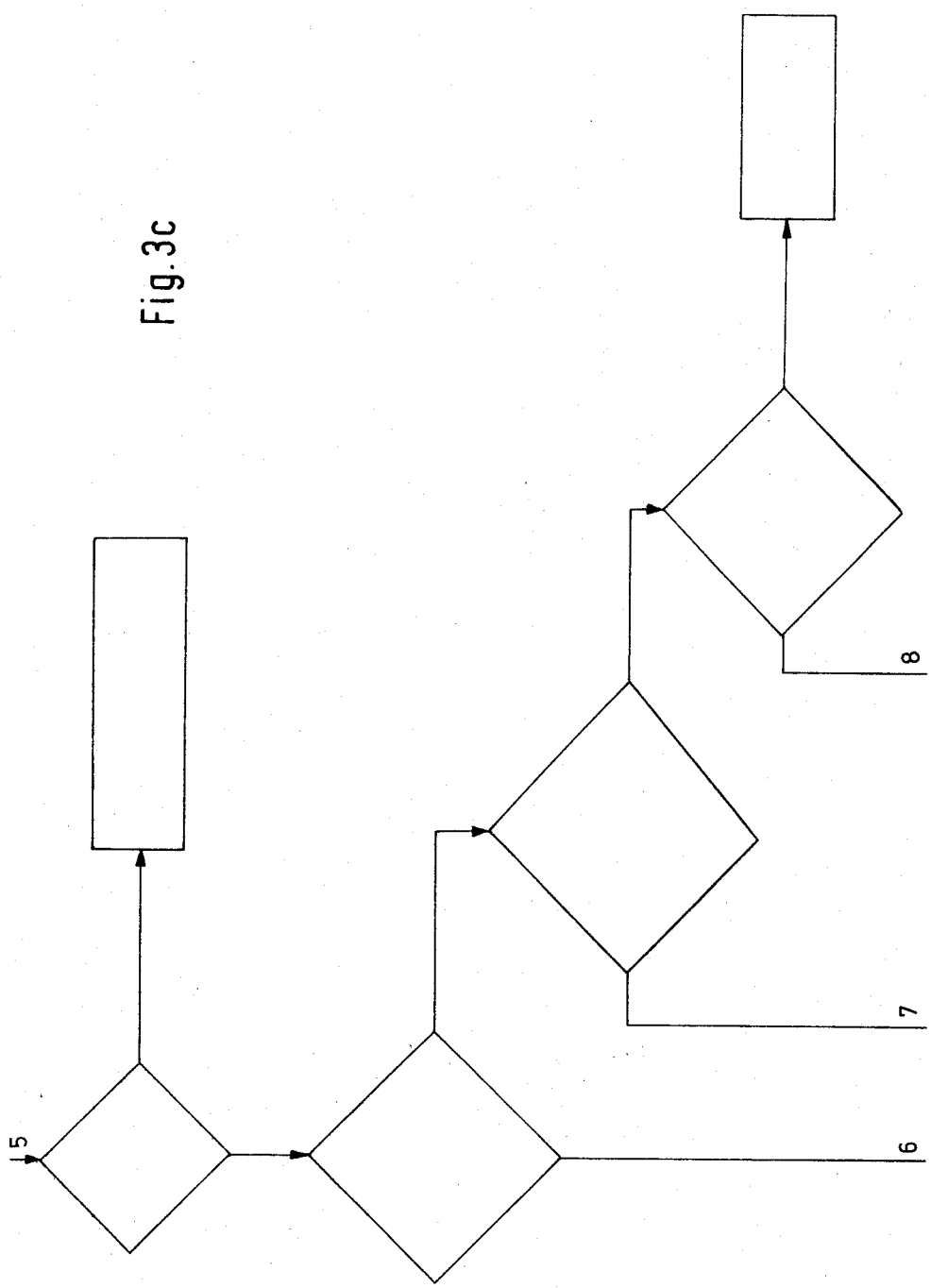

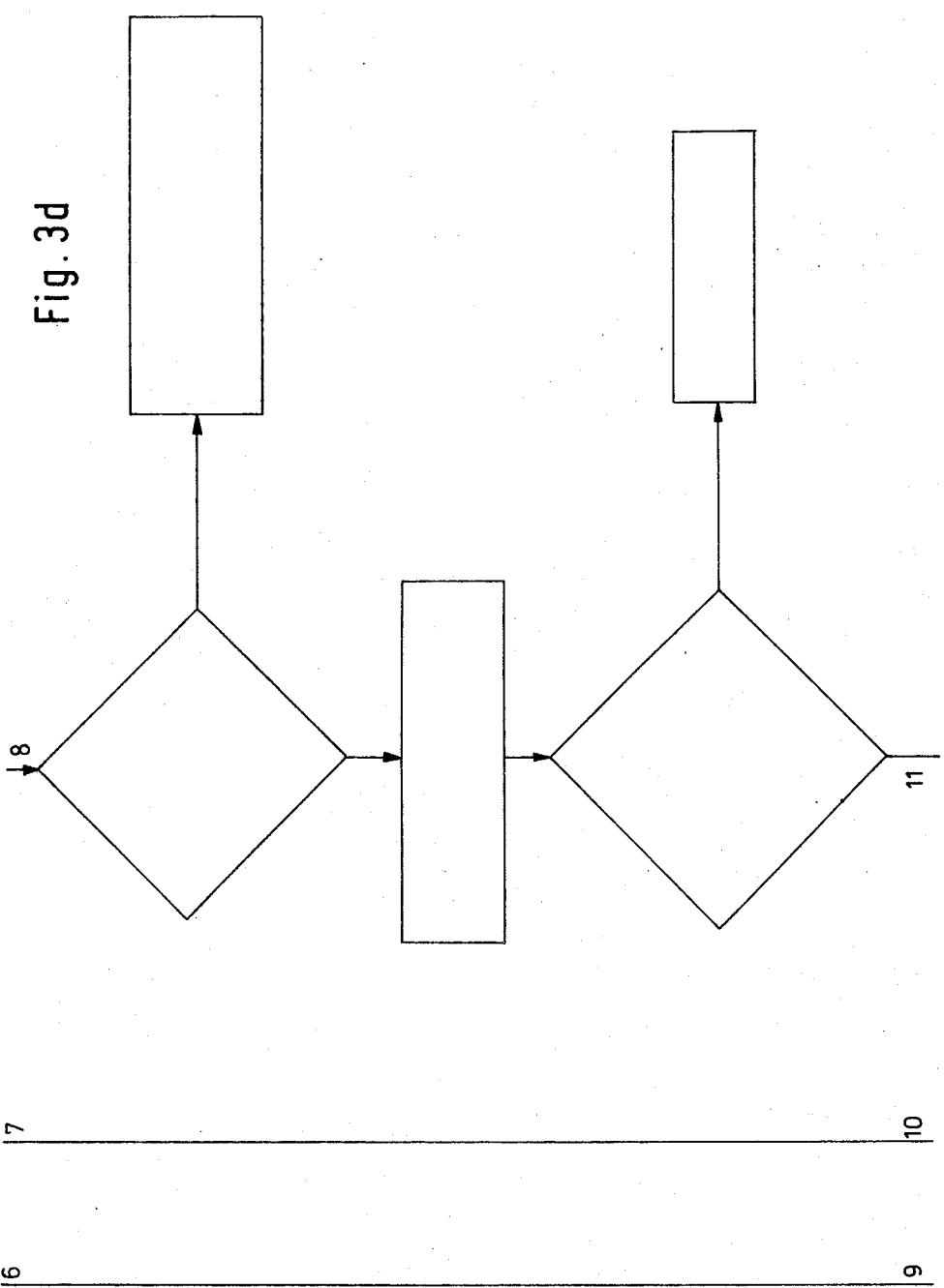

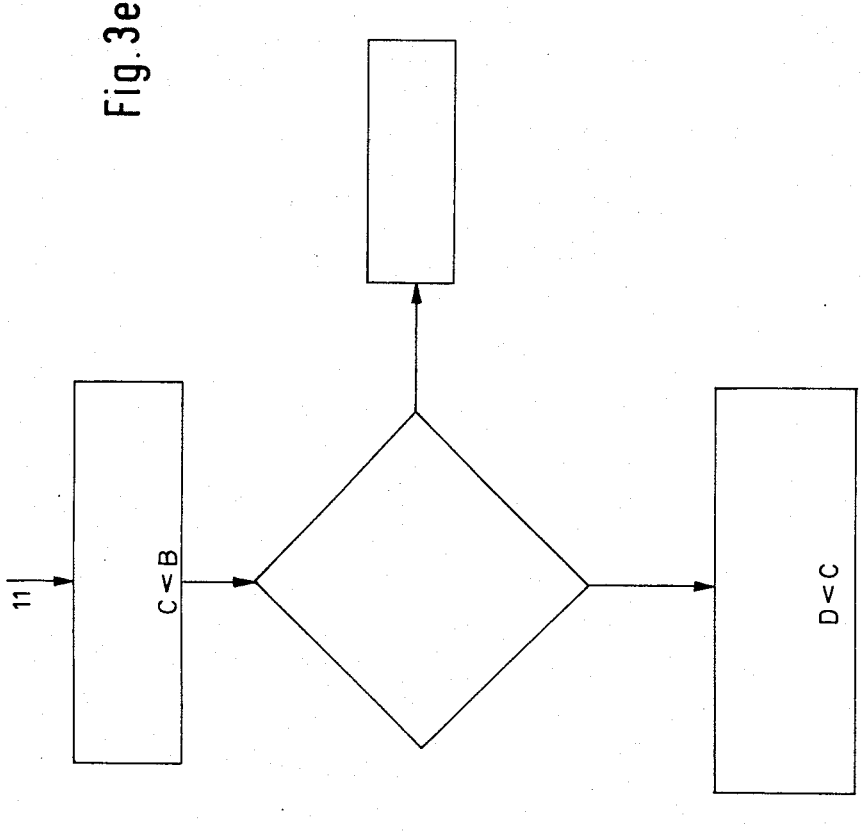
Fig.3e
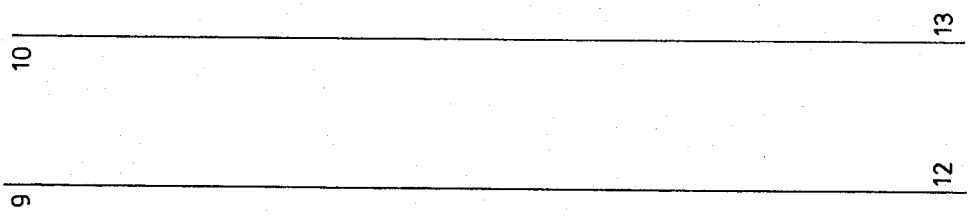

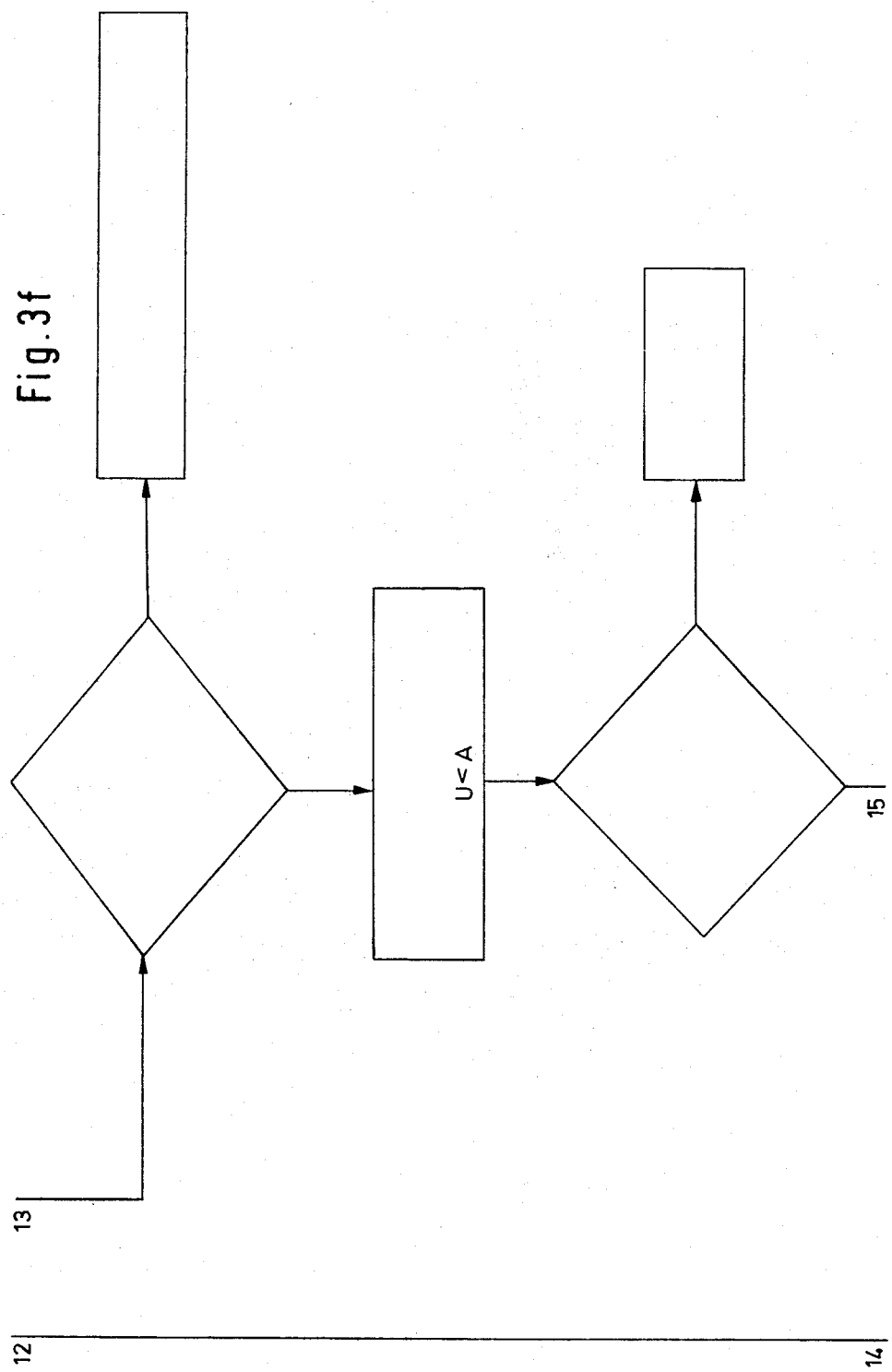

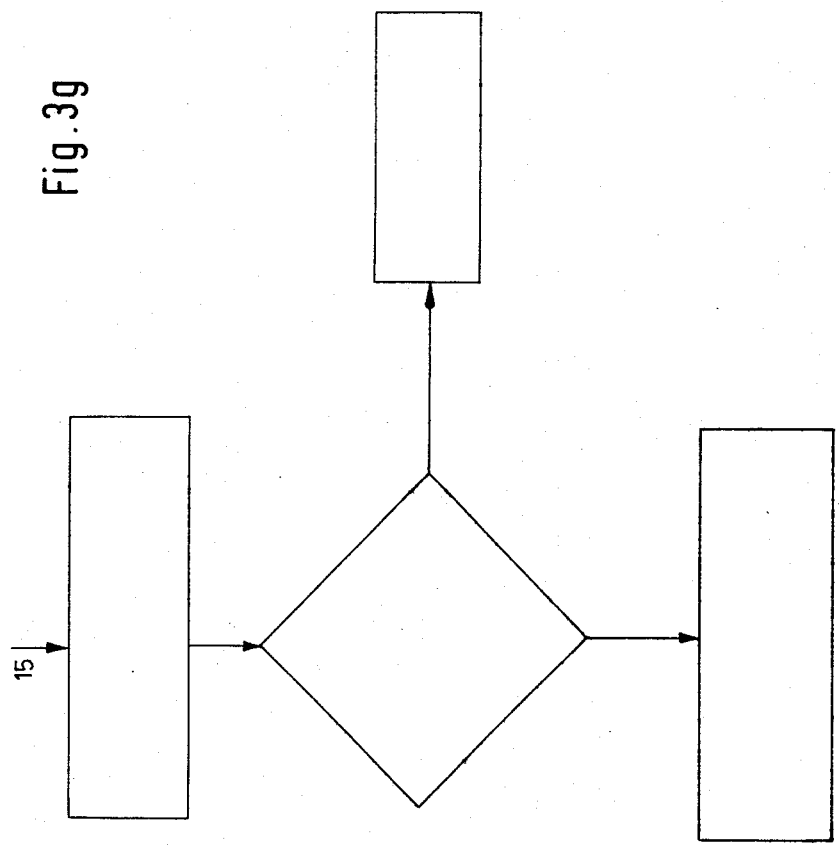

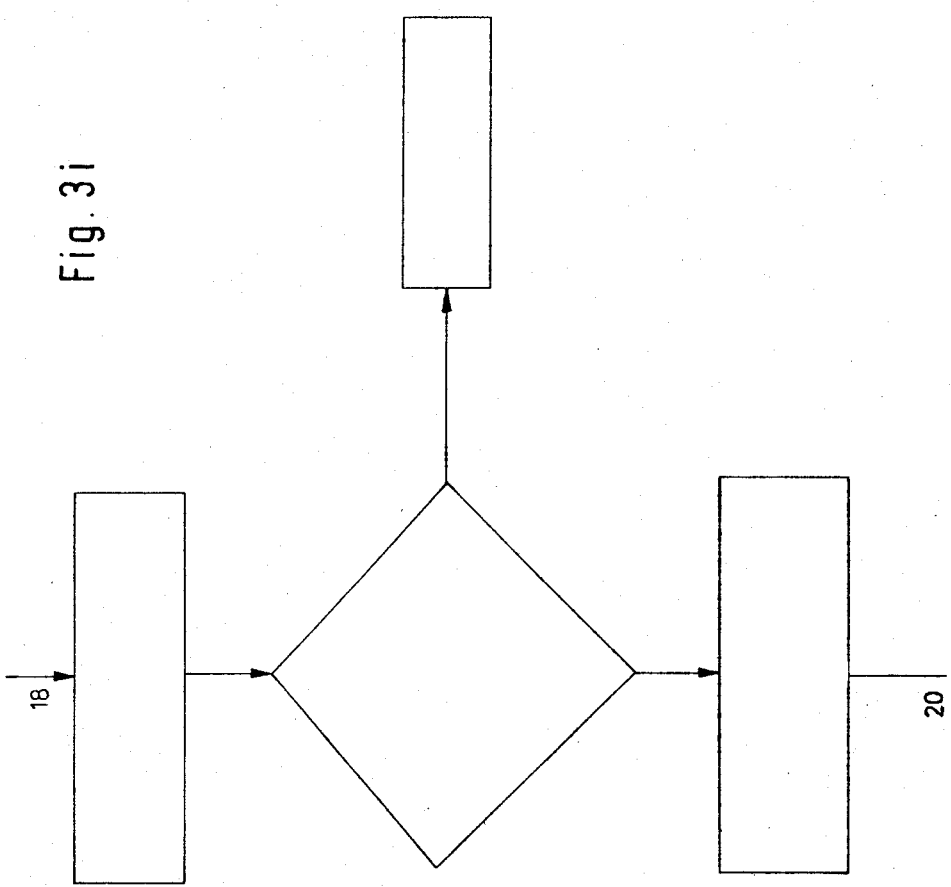

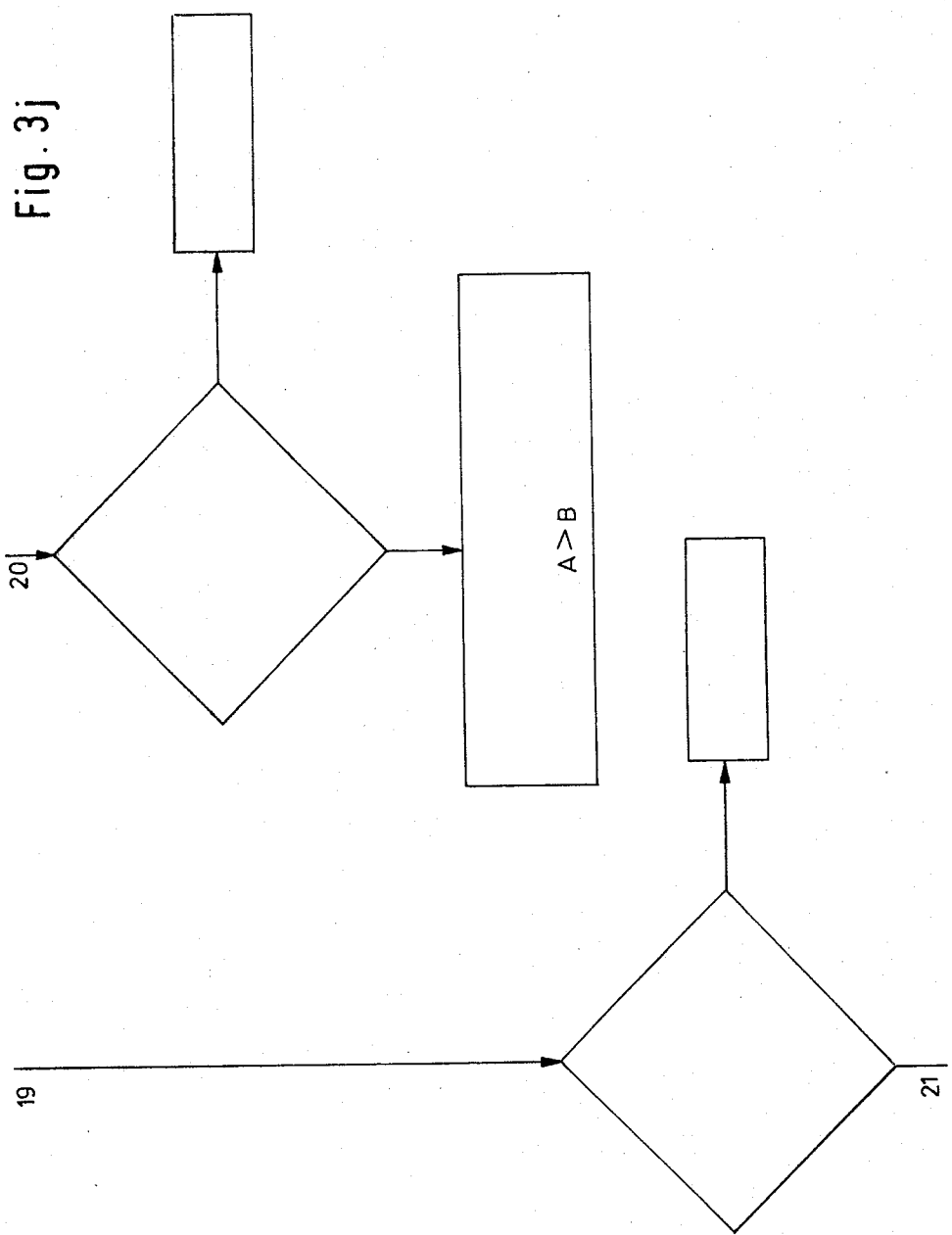

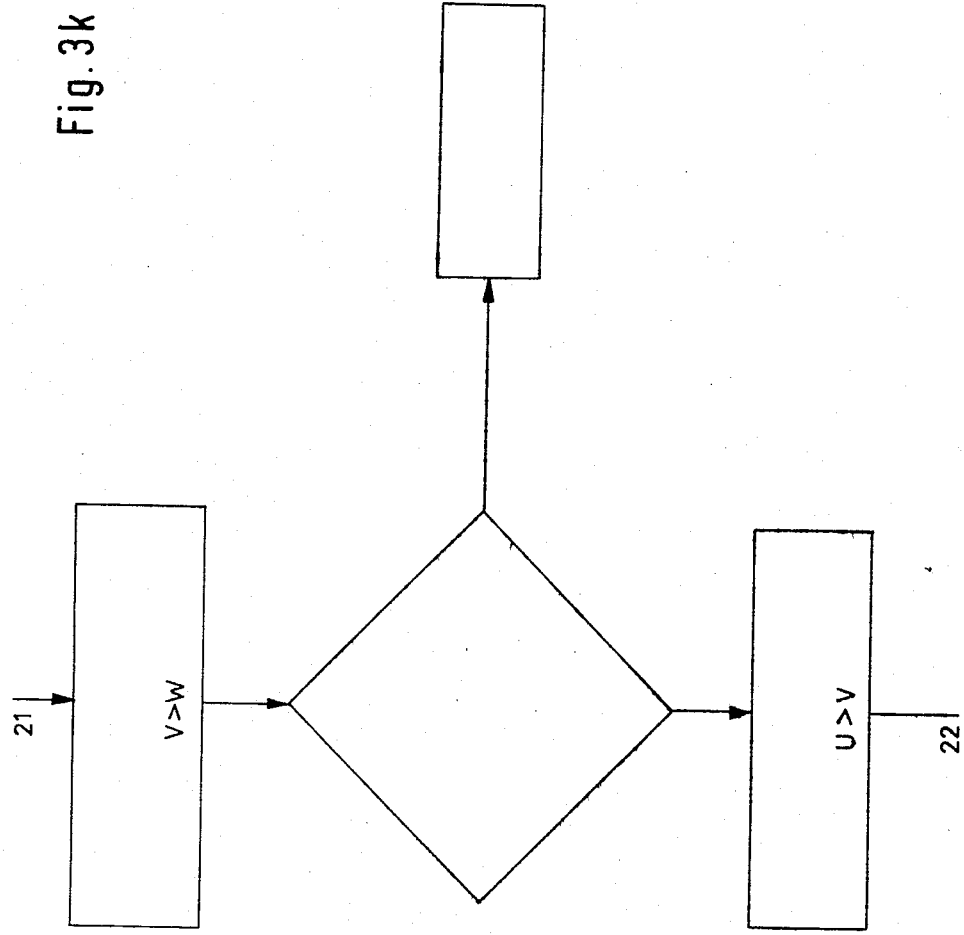

ASSEMBLY FOR GENERATING ADJUSTMENT MOVEMENTS AT AUTOMOBILE VENTILATION DEVICES

This invention relates to an assembly for generating adjustment movements at automobile ventilation devices driven by electric motors, in particular at roof openings closeable by a lid.

Automobile ventilation devices, which include not only the various roof constructions designated according to the manner of the movement of the lid or cover, namely sliding roofs, lifting roofs and sliding-lifting roofs, also include sliding windows and swing-out windows, are driven by hand or by electric motor. Hand operation is usually by means of an operating crank or toggle handle, whereas with an electric motor drive a switch or a button has to be operated for a period which depends upon the magnitude of the desired adjustment movement.

If the operating or actuating is carried out while the vehicle is being driven by the driver, the driver will be adversely affected in regard to the necessary observation of traffic. The extent of this undesired to dangerous adverse effect will depend upon the number of operations or actuations in a period of time. In driving conditions involving rapid changes of speed, it is frequently necessary to adapt the ventilation opening to the contemporary vehicle speed. Even where in such cases the operation or actuation is carried out as a matter of routine, i.e., it is hardly noticed by the driver as a conscious action, nevertheless the driving safety and comfort are unavoidably diminished.

The task underlying the present invention is to produce adjustments on automobile ventilation devices during travel, automatically and without action on the part of the occupants.

According to the present invention, this task is achieved in that, to an automobile component revolving during travel and the rotation speed of which is directly proportional to the speed of travel a generator is coupled, from which a control signal is derived, by means of which the adjustment drive for the ventilation device can be switched on according to the travel speed, in the direction of closing the ventilation device at higher speed and in the direction of opening it at lower speed.

According to the basic concept of the present invention, an adjustment of the magnitude of the ventilation opening is carried out as a function of the speed of travel. The assembly according to this invention therefore enables any operating or actuating intervention for the ventilation device during travel to be eliminated. The driver of the vehicle can keep his hands on the steering wheel, without thereby having to accept uncomfortable ventilation. The ventilation device is adjusted in an optimum manner and automatically according to the prevailing speed of travel, which is to the benefit not only of driving safety but also of driving comfort. In sliding roof constructions, in which the lid is journalled to tilt or pivot, the assembly according to this invention may be associated with the adjustment drive for the tilting or pivoting movement. To achieve an optimum ventilation, the angle of opening of the roof is here regulated as a function of the speed of travel.

With advantage, the assembly is so arranged that the switching on of the adjustment drive is effected optionally for two different ranges of travel speed, for town driving and cross-country driving. This measure permits the adapting of the ventilation to the very different ventilation requirements which obtain on the one hand for town driving and on the other hand for cross-country driving. With roof construction with a tilting lid, this means that larger lid opening angles are associated with town driving, whereas for cross-country driving the automatic control of the lid position is related to smaller angles of opening. The changing-over of the assembly from town driving to cross-country driving and vice versa can be effected by the simple operating of a button. The assembly according to this invention of course makes possible the switching-off of the automatic actuation dependent upon the speed of travel if an individual adjusting of the ventilation device is desired, which can be carried out in known manner by button operation.

The assembly may be designed for an infinitely adjustable setting of the ventilation device, wherein damping and delay devices are with advantage provided, which ensure that the ventilation device is not actuated during brief, temporary changes of speed. An assembly is, however, advantageous, in which the adjustment drive can be switched on according to speed steps and for different adjustment distances or different pivot angle values. The adjustment drive is here set in operation in accordance with the speed steps. Subdividing into three or four speed steps each for town driving and cross-country driving is completely sufficient for achieving a ventilation opening adapted to each prevailing speed of travel. This effect is still further reinforced by the fact that from step to step different adjustment distances or pivot angle values can be provided, as a result of which the adaptation to the associated speed of travel can be still further improved.

In a preferred embodiment of the assembly, provision is made for a pulse generator to be in driving connection with the tachometer shaft, to which generator a frequency-direct current converter for generating a direct current proportional to the pulse sequence is connected, which direct current generates in a succeeding resistor a control voltage porportional to the direct current, which voltage is supplied to a plurality of amplifiers, connected in parallel and set to different switch-over threshold values for the control voltage and connected as voltage comparators, which amplifiers when switched over each supply a fixed voltage signal to a summing amplifier connected after the amplifiers and connected to a supply voltage, the output signal from which summing amplifier is applied to a comparator, which is connected to a potentiometer mechanically adjustable by the adjustment movements of the ventilation device and the output signal from which comparator is applied to an electronic switch with three-point action, which switch is switched on by a positive or negative voltage signal of the comparator after a dead zone has been passed through and governs a make time delay element which supplies at the end of its delay period a signal which is applied to the adjustment drive.

In this form of embodiment of the assembly, which represents a simple circuit, the tachometer shaft is used for generating the control signal which triggers the adjustment movements, in the form of a control voltage proportional to the speed of travel. The adjustment drive switched on with positive or negative voltage signal from the comparator is automatically switched off when the output voltage of the potentiometer mechanically connected to the ventilation device is equal to the output voltage signal of the summing amplifier.

Here the switching off is effected by the interruption of the electronic switch when the voltages are equal. The preferably adjustable dead zone provided in the electronic switch allows for the inevitable follow-up movement occurring when the adjustment drive is switched off. The make time delay element has the effect that the adjustment drive is not switched on immediately a change occurs in the output voltage signal from the summing amplifier. As a result adjustment movements are avoided when only brief changes in the speed of travel of the automobile occur.

The adapting of the preferred circuit to desired different adjustment ranges for town driving and country driving can with advantage be so carried out that two parallel connected groups of amplifiers connected as voltage comparators are provided, whereby switch-over threshold values for town driving are associated with the one group and switch-over threshold values for cross-country driving with the other group, that two parallel connected summing amplifiers are provided, each of which is connected to the amplifiers of one group, and that both these summing amplifiers are connected to a change-over switch which can be operated as desired, which is connected ahead of the comparator. The actuating of the change-over switch can be effected here by electrical or electronic means by buttons, one button each being associated with town driving and cross-country driving, these buttons when actuated not only switching on the desired driving state but simultaneously switching out the other driving state. The button additionally to be provided for individual adjustment is favourably so-connected that, when it is actuated, both the automatic equipment for town driving and also that for cross-country driving are put out of operation.

The change-over threshold values associated with the speed steps can in a simple manner be made adjustable by the amplifiers being each connected to a trim potentiometer, connected as a voltage divider and connected to a stabilised supply voltage, for the purpose of setting the switch-over threshold values.

For setting the adjustment distances or pivot angle values, the assembly can be correspondingly simply so-constructed that a trim potentiometer is connected to the output of each amplifier.

The maximum ventilation opening value can in a simple manner be rendered adjustable by the supply voltage being supplied to the summing amplifier via a trim potentiometer connected as a voltage divider.

Figure 4:
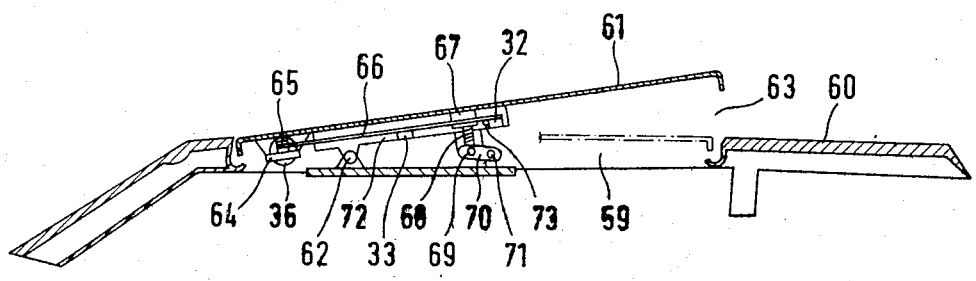

Further details and features of the assembly according to this invention are explained in more detail below with reference to the attached drawings. These show:

FIGS. 1a and 1b the block diagram of a preferred circuit arrangement,

FIGS. 2a to 2e and example of embodiment of a circuit,

FIGS. 3a to 3l a flow diagram,

FIG. 4 a diagrammatic view of a ventilation device for an automobile roof and

Figure 5:
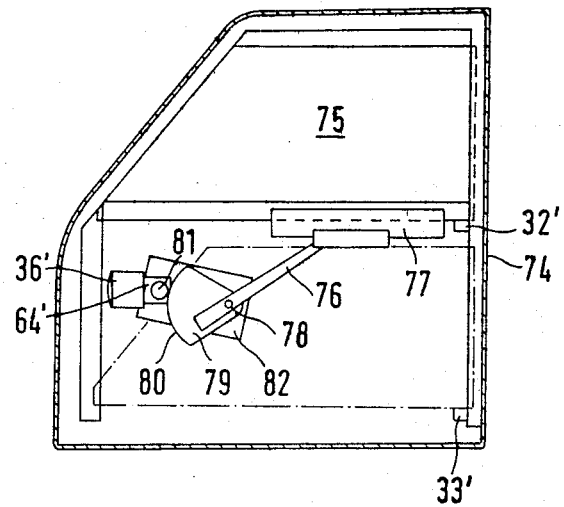
Figure 3B:
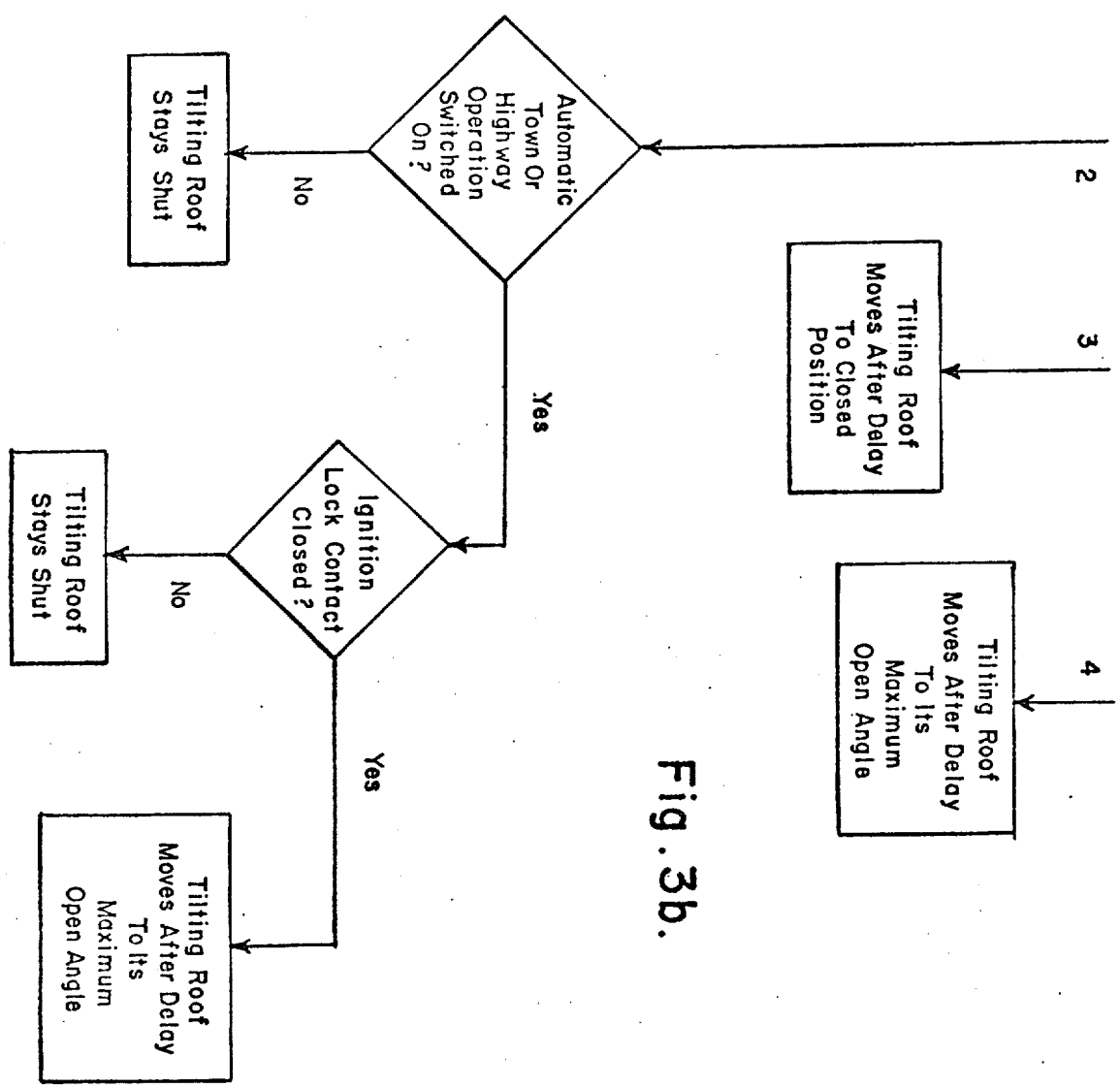
Figure 3C:
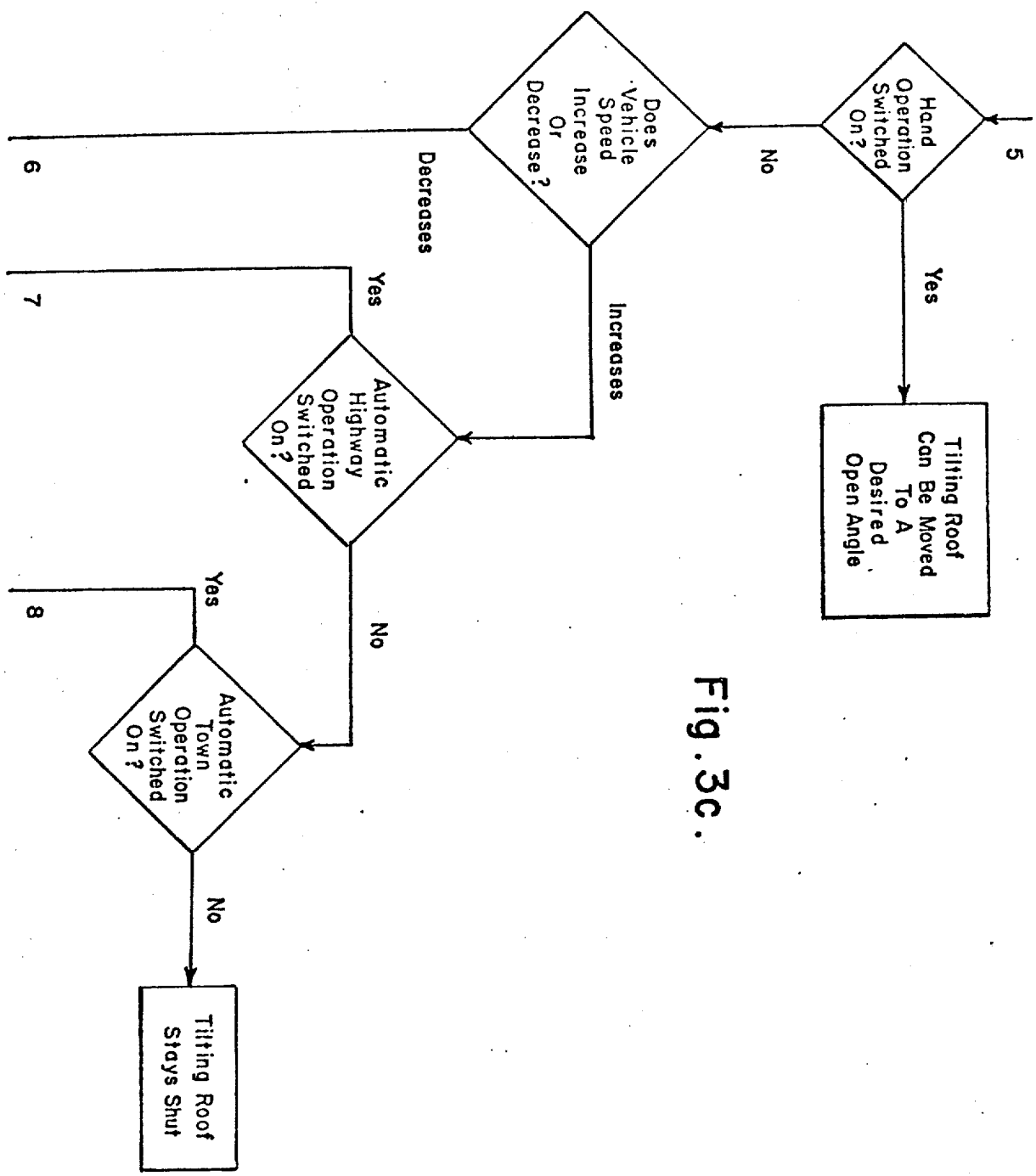
Figure 3D:
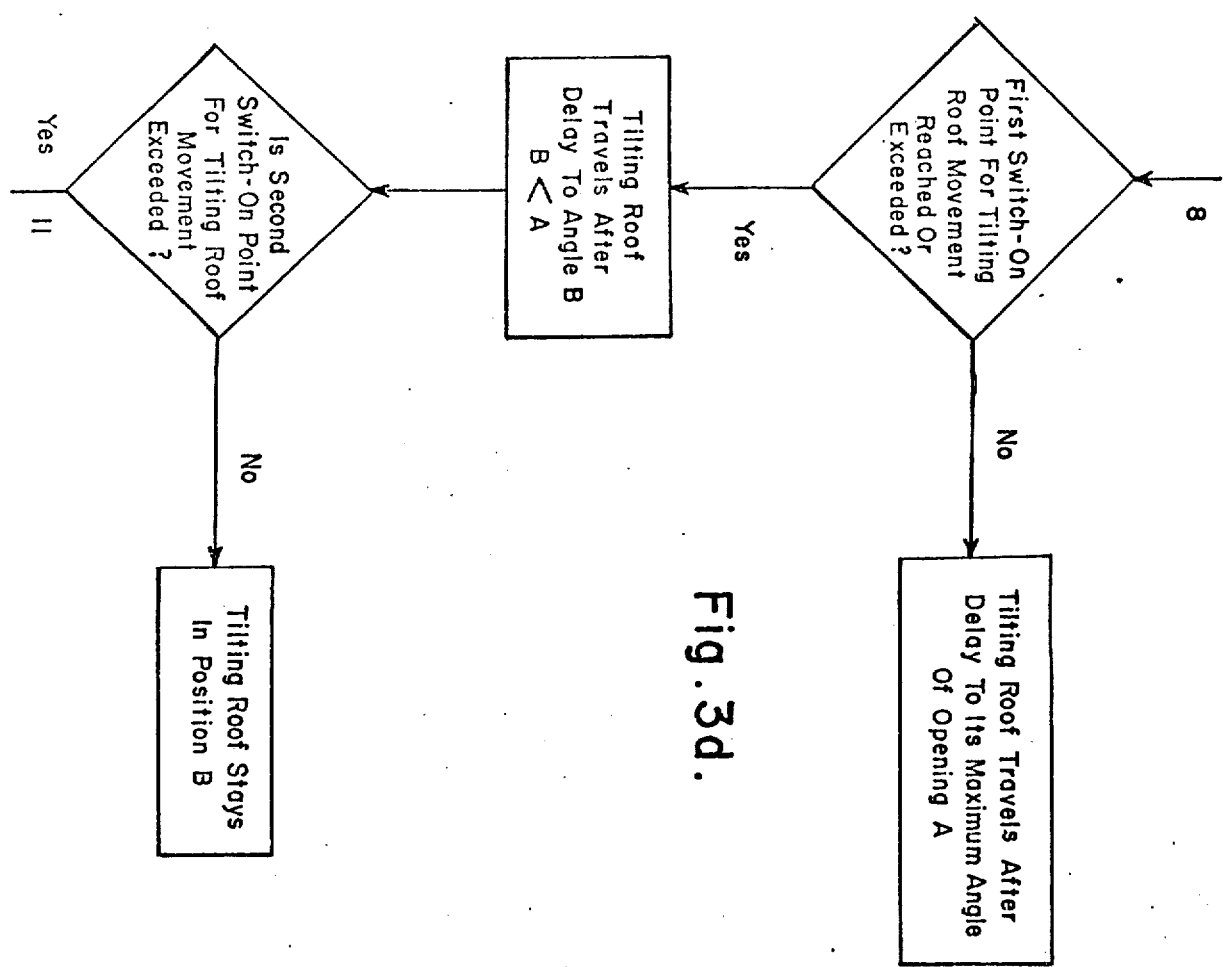
Figure 3F:
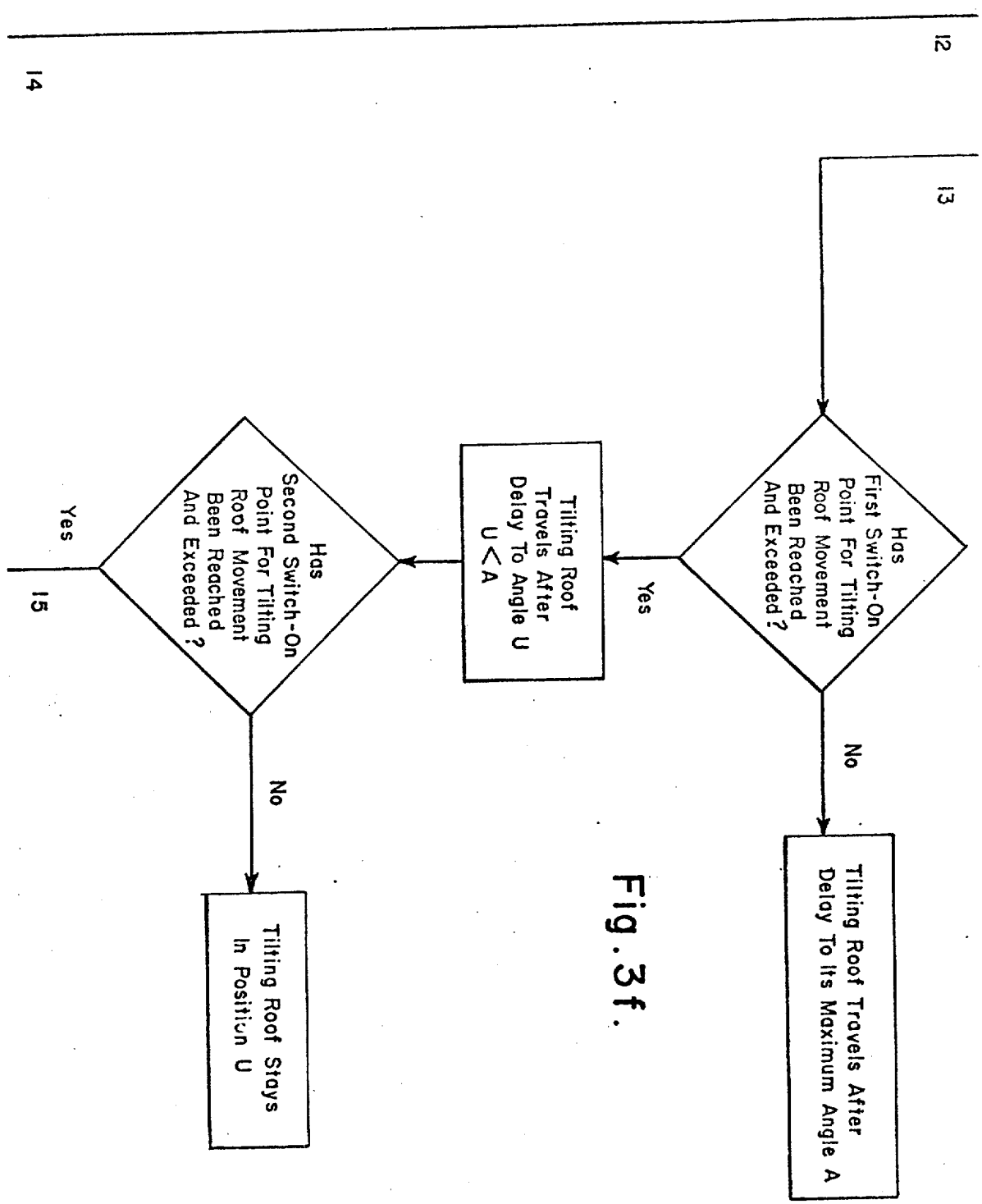
Figure 3H:
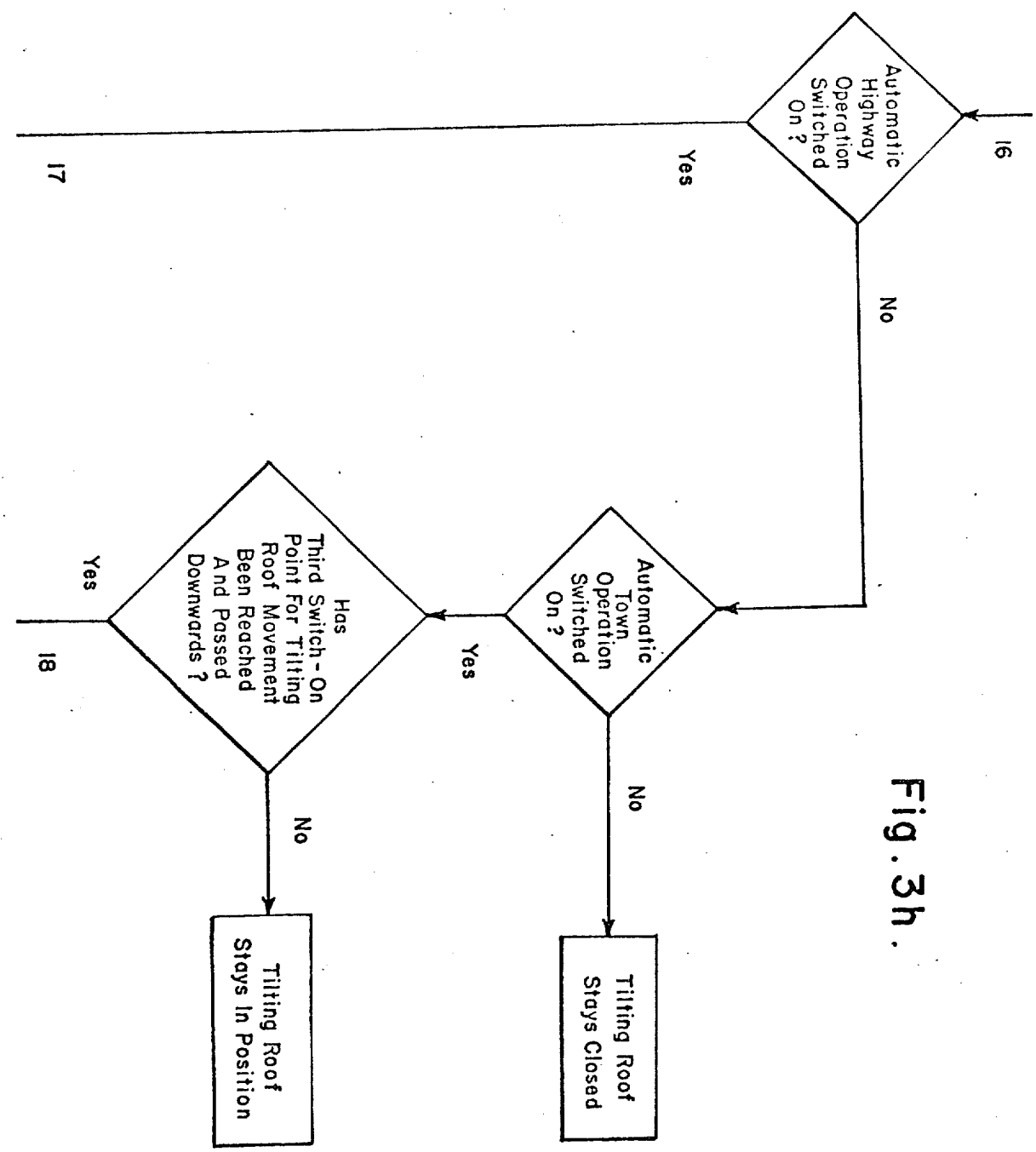
Figure 3I:
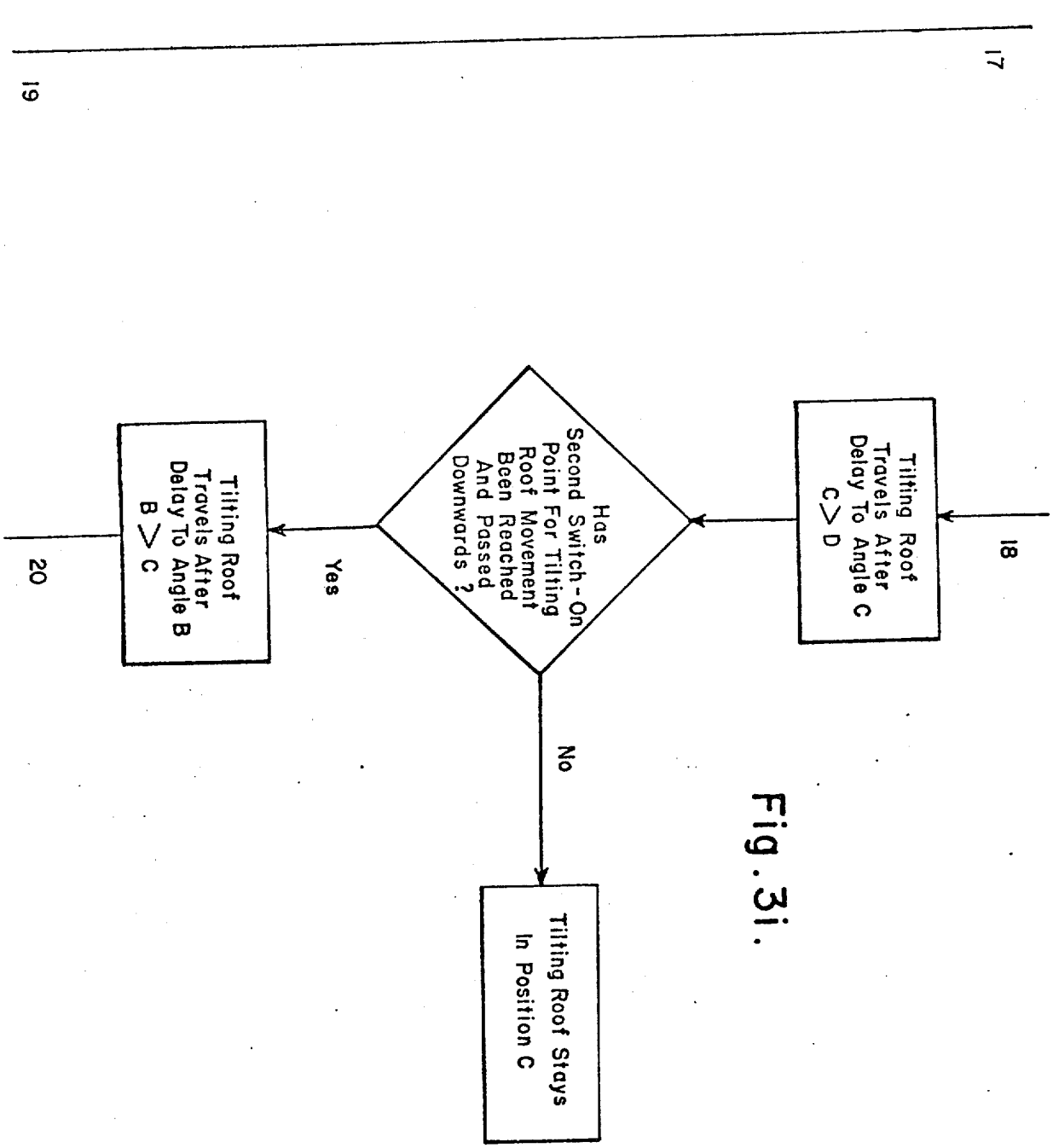
Figure 3J:
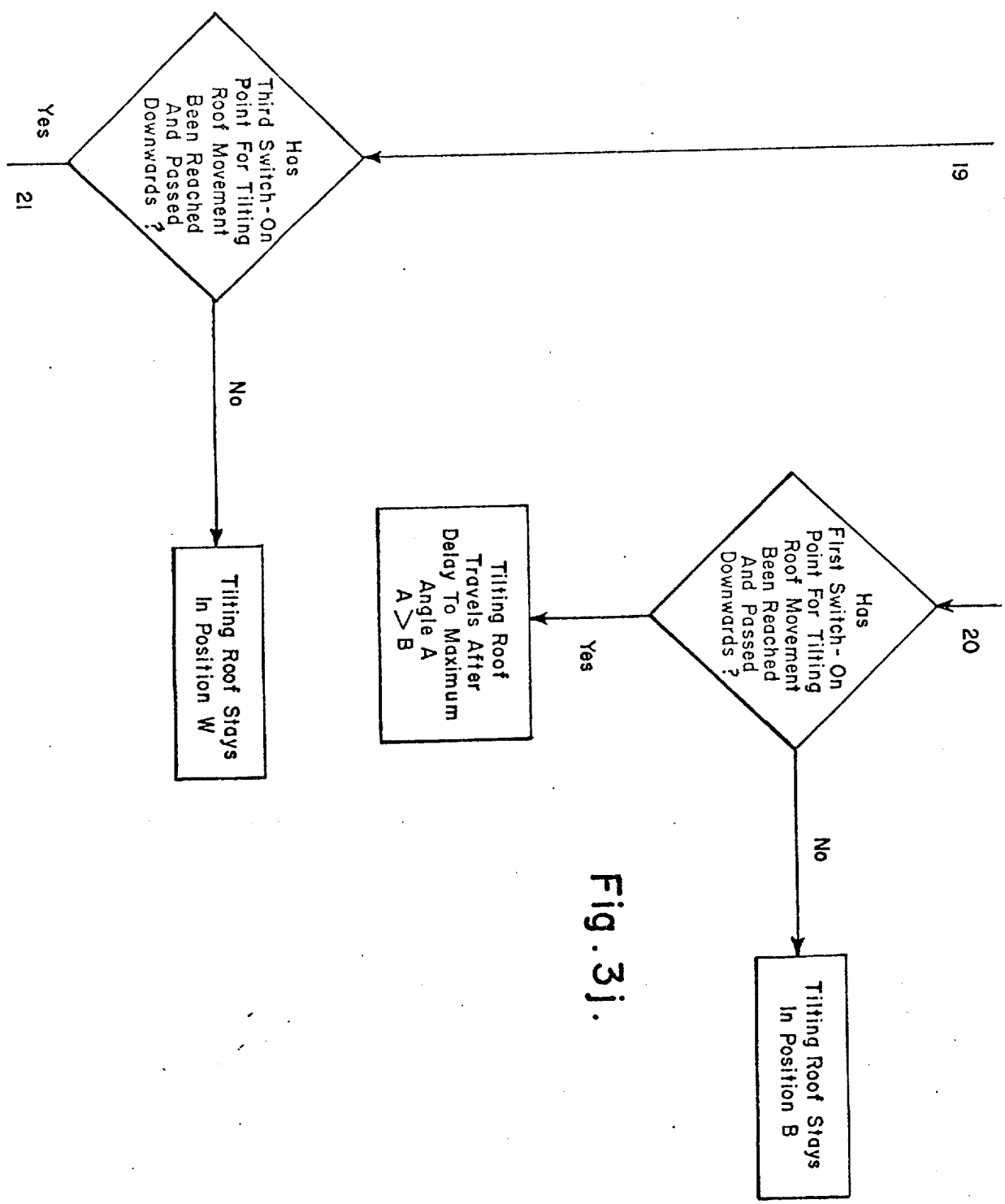
Figure 3K:
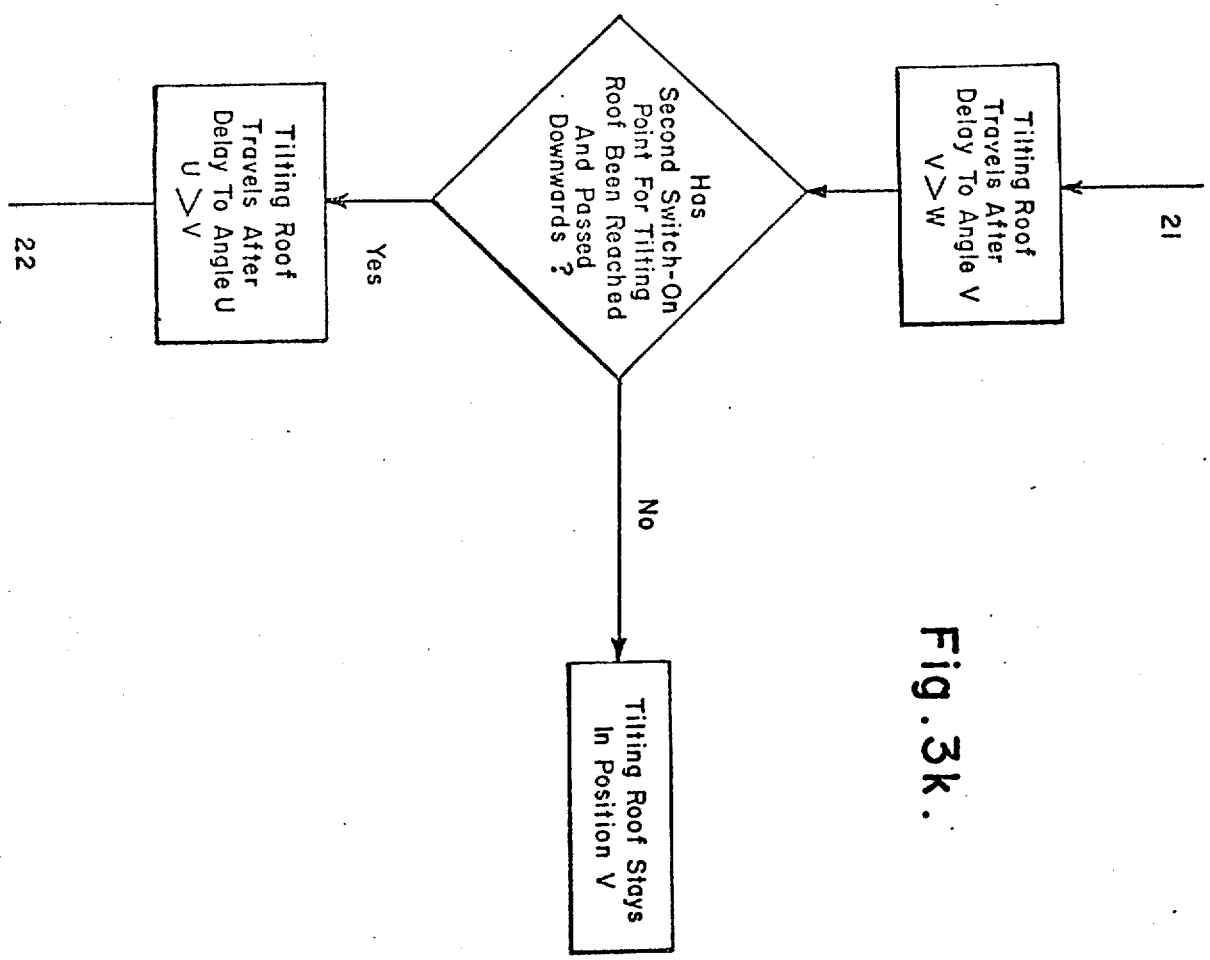

FIG. 5 a diagrammatic view of a ventilation in the form of an automobile sliding window assembly.

Figure 2A:
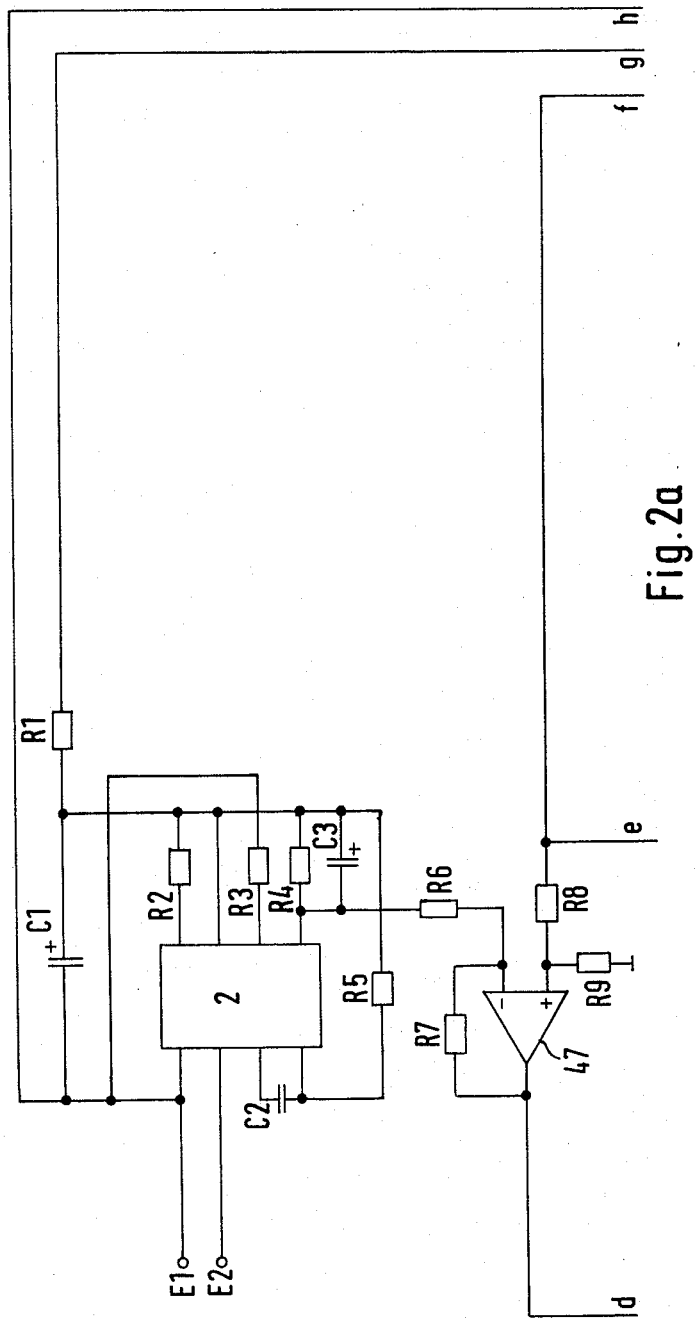
Figure 2B:
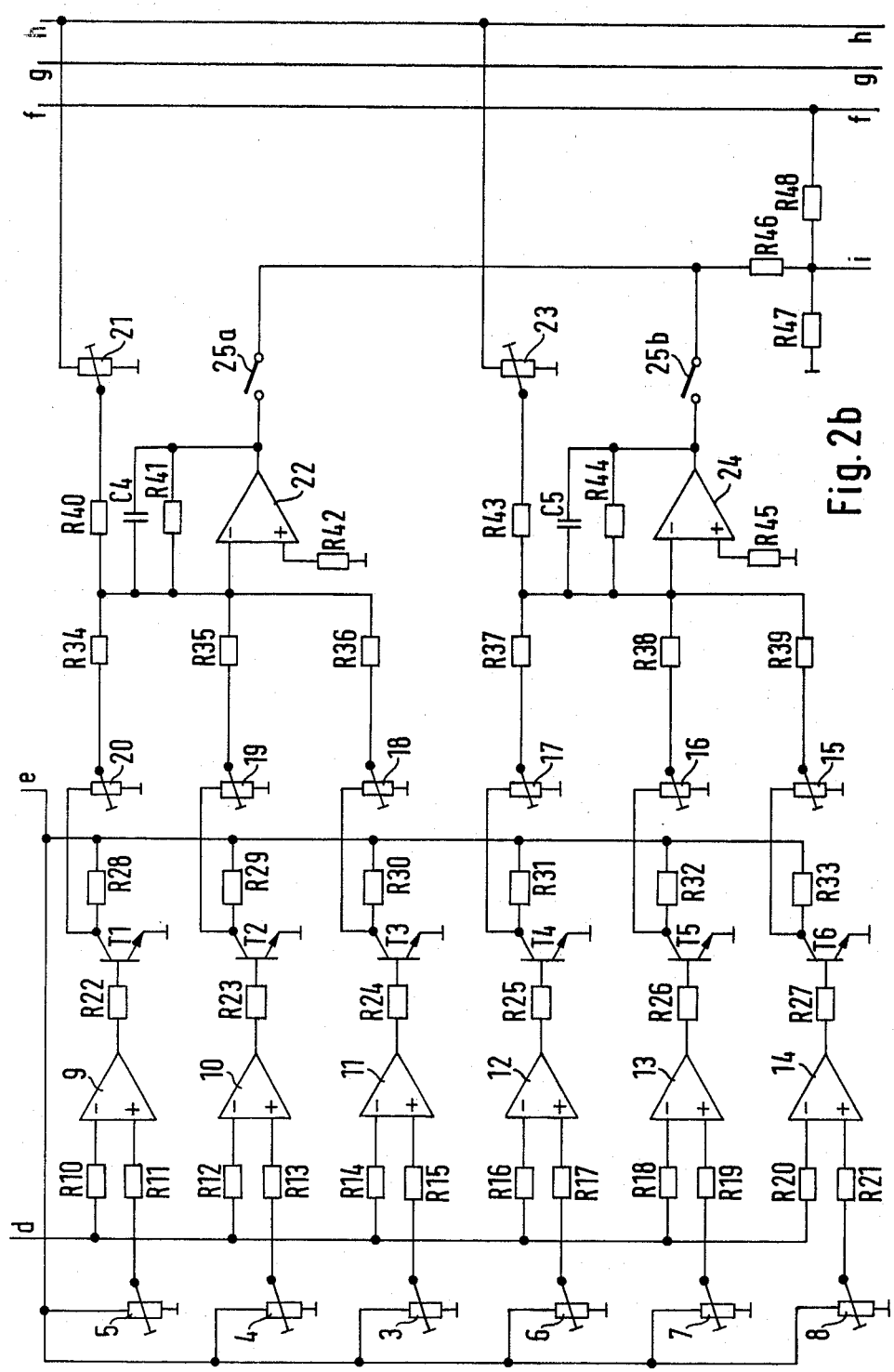
Figure 2C:
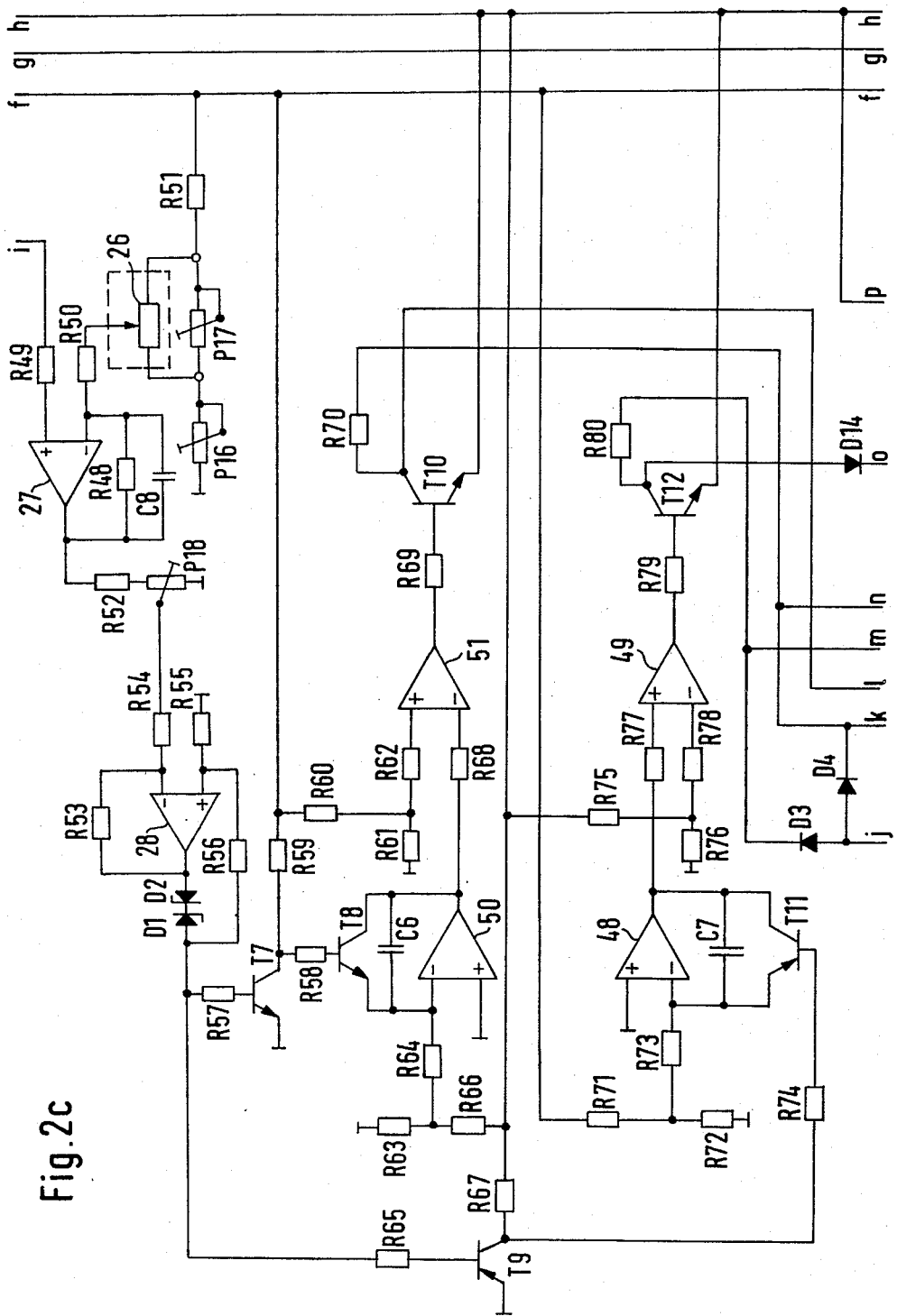
Figure 2D:
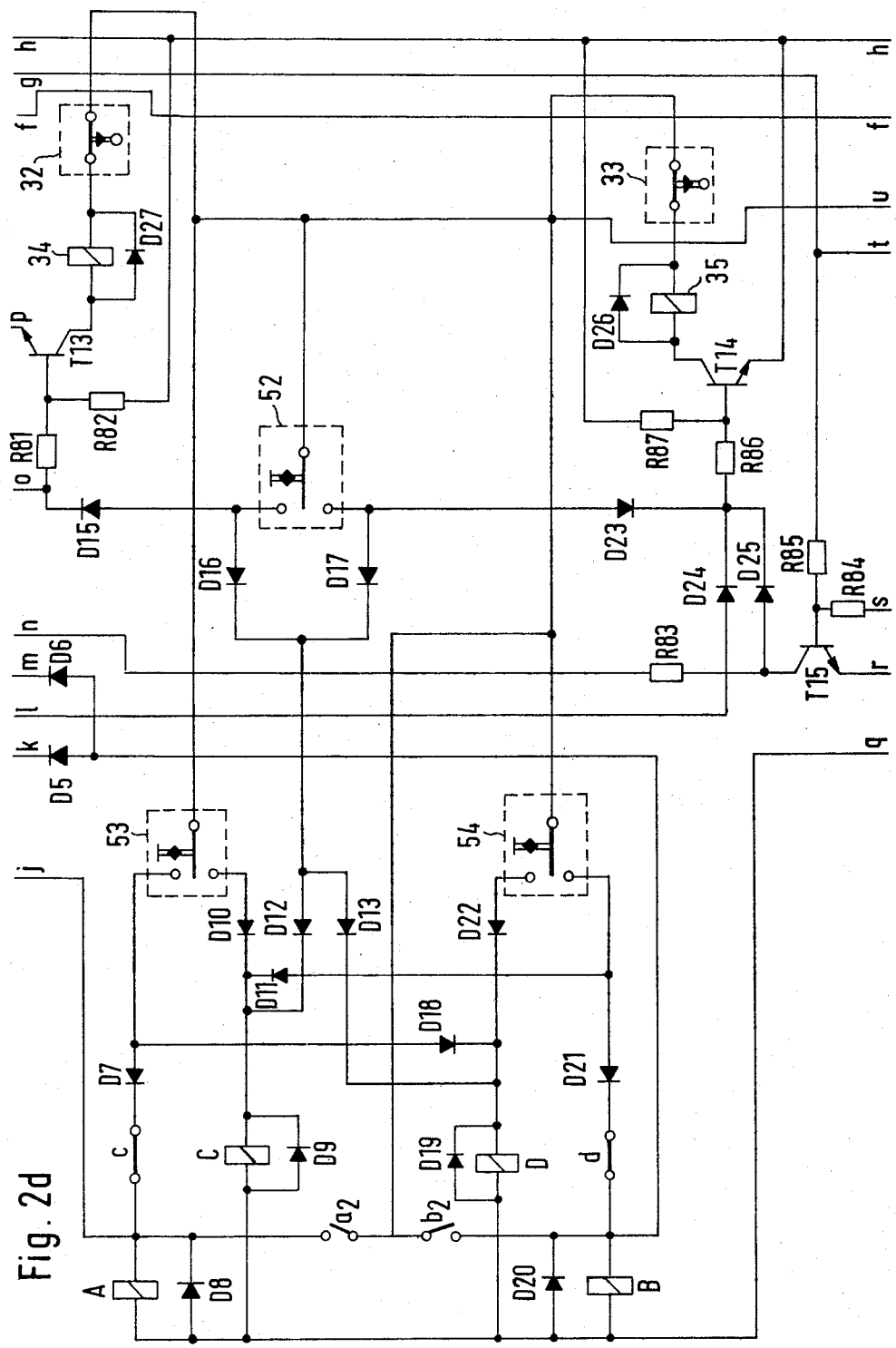
Figure 2E:
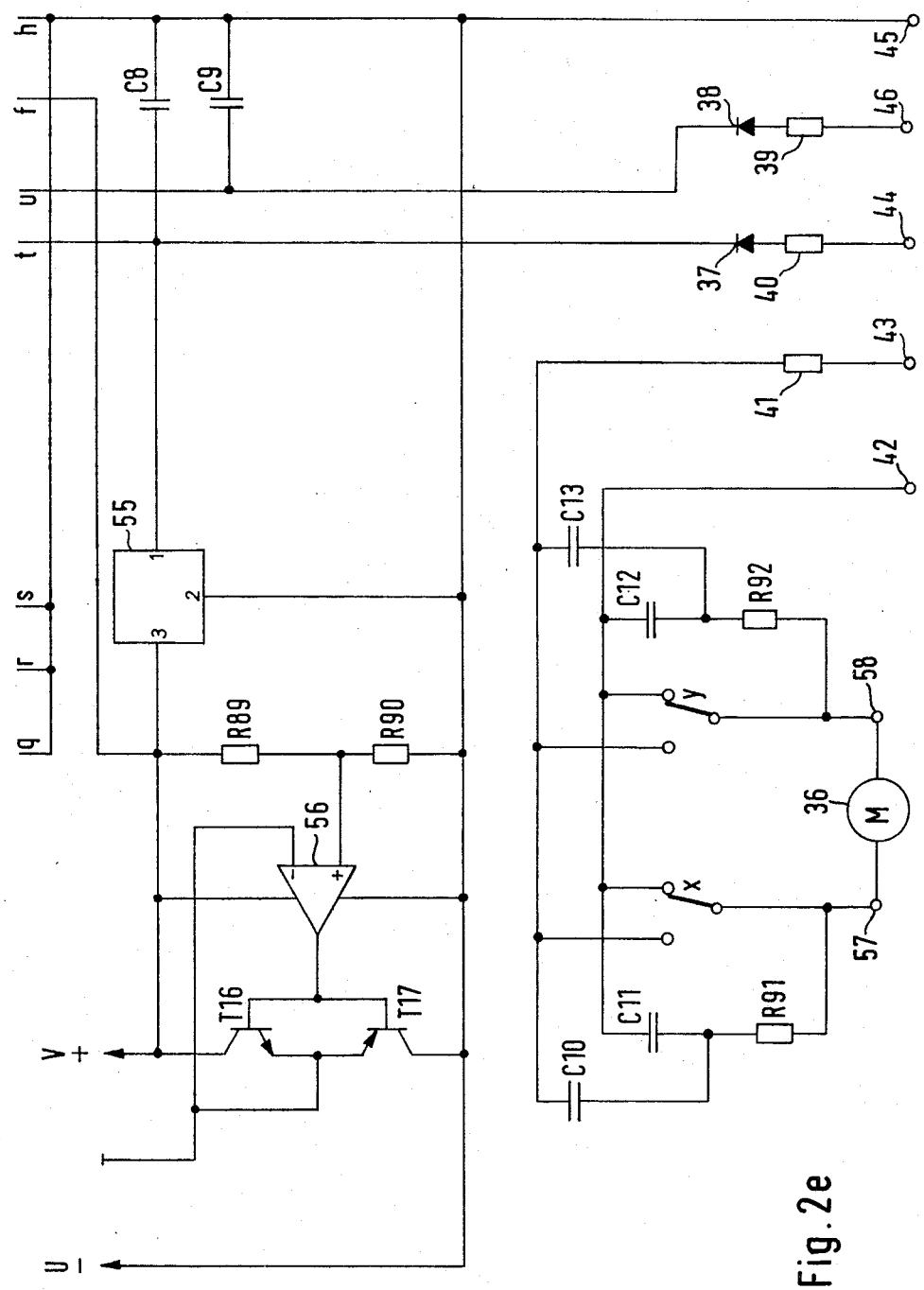

In FIGS. 1a and 1b the letters a to c denote associated circuit connections. In FIGS. 2a to 2b associated circuit connections are characterised by the letters d to u. In FIGS. 3a to 3l finally, associated lines are denoted by the numerals 1 to 22. For a basic explanation of the assembly, reference will first be made to the block diagram of FIGS. 1a and 1b.

The pulse generator 1b, which is mechanically incorporated into the tachometer shaft 1a and driven by this shaft at shaft speed, generates a pulse train which is dependent upon the rotational speed of the tachometer shaft. The pulse train is supplied to the frequency-direct current converter 2. In the frequency-direct current converter 2, the supplied pulse train is converted into a direct current proportional to the pulse train. This current in turn generates, in an electrical resistor incorporated in the converter, a direct voltage proportional to the direct current, which voltage is supplied as input control voltage to the amplifiers 9 to 14, connected as voltage comparators. The control voltage supplied to the amplifiers 9 to 14 is proportional to the rotational speed of the tachometer shaft and thus also to the speed of travel of the automobile.

Each of the amplifiers 9 to 14 possesses two inputs and one output. As can be seen from the drawing, the control voltage from the converter 2 is supplied to one input of each of the amplifiers. The second input of each amplifier is connected to a trim potentiometer 3 to 8, which are connected as voltage dividers and are connected to the stabilized supply voltage produced in functional unit 30. To the output of each amplifier 9 to 14, a trim potentiometer 15 to 20 is connected.

From the trim potentiometers 15 to 20, the electrical voltages pass to the inputs of the amplifiers 22 and 24 respectively, which are connected as summing amplifiers. To a fourth input of each amplifier 22, 24, a further trim potentiometer 21, 23 respectively is connected, which is likewise connected as a voltage divider and is in connection with the stabilized supply voltage. The trim potentiometers 3, 4, 5 and 18 to 21 and the amplifiers 9 to 11 and 22 represent the input functional group for town driving, while trim potentiometers 6, 7, 8, 15, 16, 17 and 23 and the amplifiers 12, 13, 14 and 24 represent the input functional group for cross-country driving.

The method of functioning of the two functional groups will now be explained in more detail with reference to the functional group provided for town driving. The trim potentiometers 3, 4, 5 serve for the variable setting of the switch-over thresholds of the voltage comparators 9, 10, 11. So long as the automobile is stationary, no electrical control voltage is generated at the output of the converter 2, so that the voltage comparators cannot emit any active output signal. If the vehicle is set in motion, then with increasing speed of travel the electrical control voltage also increases. If the value of the control voltage now reaches the set switch-over threshold, for instance, of the voltage comparator 11, then this comparator is switched over and at its output a fixed voltage signal is produced, which is supplied via the next connected trim potentiometer 18 to the summing amplifier 22. In the same manner, the voltage comparators 9 and 10 are switched over as the control voltage increases and their fixed output signals arrive, via the trim potentiometers 20 and 19, likewise at the summing amplifier 22.

If the speed of travel of the automobile decreases, then the voltage comparators 9, 10 and 11 are switched over in the reverse sequence by the decrease of the control voltage, back into their starting position, in which no fixed voltage signal is emitted by them.

At the trim potentiometers 3, 4, 5, three different and mutually independent settings for the switch-over thresholds of voltage comparators 9, 10 and 11 can be carried out within the range of travel speed of the vehisupply voltage, for the purpose of adjusting the switch-over threshold values.

5. Assembly according to claim 2, wherein a trim potentiometer for the setting of the adjustment distances or pivot angle values is connected to the output of each amplifier.

6. Assembly according to claim 2, wherein the supply voltage is supplied to the summing amplifiers via a trim potentiometer connected as a voltage divider for the purpose of setting the maximum ventilation opening value.

7. An assembly as set forth in claim 1, wherein said drive means is an electric motor, and said electric motor can be switched on according to speed steps for different adjustment distances or different pivoting angle values.

* * * * *

As a result, the positive partial voltage, applied via the voltage divider R71, R72 at the input resistor R73, at the inverting input of the amplifier 48, wired as an integrator, becomes effective, and the integrating condenser C7 is slowly charged to a negative voltage. The output voltage from the integrator 48 is supplied via the input resistor R77 to the non-inverting input of the amplifier 49, connected as a voltage comparator. The inverting input of the voltage comparator receives, via the voltage divider R75, R76 and its input resistor R78, a negative voltage. If, after a defined period, the output voltage of the integrator now exceeds the partial voltage of the voltage divider R75, R76, then the voltage comparator switches over to a negative output voltage and blocks the transistor T12. As a result the collector voltage of transistor T12 rises to a fixed positive voltage, causing the transistor T13, via the diode D14 and the resistor R81, to be set into the conducting state. The transistor T13 switches on the relay 34. Via the relay contact x (FIG. 2e) the drive motor 36 is set in motion and the tilting roof travels into a larger angle of opening.

The tilting roof is travelled towards a larger angle of opening until the output voltage of potentiometer 26 brings back the output voltage of amplifier 27 to such a voltage value as will cause a switching-over of the flip-flop stage 28 to zero potential. At the trim potentiometer P18, the effective dead zone of the flip-flop stage can be increased or reduced. As soon as there is a zero potential at the output of the flip-flop stage, the transistor T9 is blocked, its collector voltage rises to a fixed negative voltage and thereby sets the transistor T11 into the conducting state. This transistor short-circuits the integrating condenser C7 and thus brings the output voltage of the integrator 48 back to zero potential. At the same time the voltage comparator 49 is switched over to a positive output voltage and the transistor T12 is opened, which leads to a blocking of the transistor T13. This transistor switches out the relay 34 and thus also switches off the drive motor. The circuit components 48 to 51 together constitute the make time delay element 29 described with reference to FIG. 1a.

If the voltage at the non-inverting input of amplifier 27 is smaller than that at the inverting input, then after the dead zone has been passed through, the output of the flip-flop stage 28 is switched to a positive voltage, the transistor T7 is opened and the transistor T8 is blocked. With the blocking of the transistor T8 the integrator 50 commences to integrate. After a defined period, the voltage comparator 51 is switched over and the transistor T10 is thereby blocked. Through the diode D24 and resistor R86, the transistor T14 is brought into the conducting state. This transistor switches on the relay 35, causing the drive motor 36 to be set in motion via the relay contact y (FIG. 2e) and the tilting roof to be moved to a smaller angle of opening. The tilting roof is travelled to a smaller angle of opening until the output voltage of potentiometer 26 switches the flip-flop stage 28 back to zero potential via the amplifier 27, and thereby the relay 35 is switched off by the succeeding elements.

The limit switches 32 and 33 are incorporated into the range of the tilting roof. Limit switch 32 is actuated at the maximum angle of opening of the tilting roof and limit switch 33 when the roof is closed. In this way further travel of the drive motor 36 is prevented. Automatic town driving is switched on and off by the flip-flop switch 53 and automatic cross-country driving by flip-flop switch 54.

When the flip-flop switch 53 for town driving is actuated, the relays A and D are switched on via the diodes D7, D8 and the working resistors R70, R80 of the transistors T10, T12 are supplied with positive voltage via the diodes D3, D4. The relay contact 25a switches the output of the summator 22 to the input of amplifier 27. The relay contact a2 switches on the self-holding of relay A. Through the diode D10, the relay C can be switched on and thus town driving can be cut out.

When the flip-flop switch 54 for cross-country driving is actuated, the relays B and C are switched on via the diodes D21, D11 and the working resistors R70, R80 of the transistors T10, T12 are supplied with positive voltage via the diodes D5, D6. The relay contact 25b switches the output of the summator 24 to the input of the amplifier 27. The relay contact b2 switches on the self-holding of relay B. The relay D can be switched on via the diode D22 and thus cross-country driving can be cut out. A simultaneous operation of town and cross-country functions is prevented by diodes D11, D18.

With the flip-flop switch 52 for non-automatic operation, either the relay 34 can be directly switched on via the diode D15 and the transistor T13, or the relay 35 via the diode D23 and the transistor T14. With the switching on of the flip-flop switch 52, the relays C and D are switched on via diodes D16, D17 and diodes D12, D13, causing automatic operation to be cut out.

The terminal 44 is connected to the make contact of the ignition lock. As soon as the ignition is switched on, the positive battery voltage passes, via the fuse 40 and the protective diode 37 to the input of the voltage stabilizer 55, to the frequency-current converter 2 and, via the resistor R85 to the base of the transistor T15. The transistor T15, if automatic operation is switched on, is brought into the conducting state and its collector voltage falls to zero potential. However, as soon as the ignition lock is cut out, blocking of the transistor takes place and with the automatic operation switched on a positive voltage passes via resistor R83 and diode D25 to the base of the transistor T14. This transistor is brought into the conducting state, thereby switches on the relay 35, causing the tilting roof to move to the shut position.

The stabilized output voltage from the stabilizer 55 is supplied on the one hand to the various terminal points of the circuit and on the other hand to the amplifier 56. The amplifier 56 generates, in conjunction with the connected transistors T16, T16, the virtual zero potential and the necessary positive and negative operating voltage for supplying the amplifiers 47, 9 to 14, 22, 24, 27, 28, 29.

From the terminal 46, via the fuse 39 and protective diode 38, the relays A to D and 34, 35 are supplied with the positive battery voltage. Terminal 45 is connected to the negative pole of the battery. Connecting of the drive motor 36 is provided via the connection terminals 57 and 58. Terminals 42 and 43 are connected directly to the battery. The fuse 41 serves for protecting the motor circuit. The condensers C10 to C13 in conjunction with the resistors R91 and R92 serve for the contact protection circuit of the relay contacts x and y.

Of the aforementioned electronic and electrical components, the diodes 3 to 8, 10 to 13, 15 to 18, 21, 22, 23, 25, the relays A to D, the relay contacts a2, b2, the transistors T13 to T17, the voltage stabilizer 55, the resistor R83 and the amplifier 56, constitute together the functional unit 30 explained with reference to FIG. 1a, 1b.

The comprehensive flow diagram given in FIG. 3a to 3l illustrates the functioning of the assembly according to this invention in all operating states. The basis assumed throughout is that of a tilting roof, that is an automobile roof, in the roof opening of which a tiltably mounted closure lid is disposed. The functional diagram applies in principle, of course, to any other ventilation device in an automobile, for example opening windows. The term "hand operation" used in the flow diagram relates to the operating state resulting after actuation of the flip-flop switch 52. In other respects, the flow diagram is self-explanatory and therefore does not require any more detailed explanation here.

FIGS. 4 and 5 illustrate automobile ventilation devices for which the assembly according to this invention may be used. FIG. 4 shows a roof ventilation device, in which a tilting lid 61 is pivotally mounted about a hinge axis 62 in the opening 59 of an automobile roof 60. The tilting lid 61 is shown in full lines in its maximum opening position, in which at its rear end a ventilation gap 63 communicating with the interior of the automobile is formed. The partial view shown in dot-and-dash line illustrates the position of the tilting lid 61 in the closed state.

In the vicinity of its forward end, the tilting cover 61 carries on its underside the motor 36, equipped with a reduction gear 64. In a drive casing 65, bolted to the gear 64, a driven pinion or the like is in driving engagement with a longitudinally displaceable toothed rack 66 or the like. The toothed 66 passes through a casing 67 for a driven mechanism, in which it drives a gear wheel (not shown), keyed to a threaded spindle 68. The threaded spindle is articulated at its outer end at 69 to a pivoting strap 70, which in turn is in articulated connection at 71 with the fixed portion of the automobile roof. Longitudinal displacements of the toothed rack 66 produced by the motor 36 and its reduction gear, lead to retraction or extension of the threaded spindle 68, causing the angle of tilt of the lid 61 to be changed.

The limit switches 32 and 33, associated with the limiting positions of the tilting lid, are situated on a longitudinal beam 72 fixed to the lid 61. These limit switches 32 and 33 are switched by an actuating projection 73 fixed to the toothed rack 66.

In FIG. 5 an automobile door 74 is shown, in which a sliding window 75, capable of being lowered into the window shaft of the door 74, is guided. The lifting movements of the window 75 are produced by an arm window lifting, the lifting arm 76 of which engages, with a sliding joint (not shown), a lifting bar 77 attached to the window pane 75. The lifting arm 76 is pivotally journalled at 78 and is firmly keyed to a gear wheel sector 79, capable of moving about the same pivot axis. The teeth 80 (not illustrated in detail) of the gear wheel sector 79 engage with a drive pinion 81, which is driven by the motor 36' via a gear 64' connected to it. The described window lifting assembly is fixed by means of a mounting plate 82 to the door plate.

The window pane 75 is shown in full lines near to its closed position. Its fully open position can be seen from the dot-and-dash lines. When the motor is switched on, the pinion 81 rotates the toothed sector 79 according to the direction of rotation of the motor, causing the lifting arm 76 to pivot either clockwise or counterclockwise, leading respectively to a closing or opening movement of the window. In its two limiting positions, the window once again actuates limit switches 32', 33' respectively.

The automobile ventilation devices described briefly with reference to FIGS. 4 and 5 are basically of conventional construction and therefore require no more detailed explanation here, particularly since they are not the subject of the present invention. The constructional details explained of course represent merely examples of embodiment. The assembly according to this invention can be combined with any automobile ventilation devices at which adjustment movements are to be carried out.

I claim:

1. In combination an assembly generating adjustment movements on automobile ventilation devices driven by motor drive means, especially on roof openings closeable by a slideable or pivoted lid comprising: a generator coupled to a component of the automobile which revolves during travelling and the rotational speed of which is directly proportional to the speed of travel, said generator generating a control signal to adjust said drive means for the ventilation device which is switched on according to the speed of travel, in the direction of closing the ventilation device at a higher speed and in the direction of opening at a lower speed; said switching on of the drive means is carried out optionally for two different ranges of travel speed, one for town driving and the other for country driving; said drive means can be selectively switched on.

2. Assembly according to claim 1 wherein, said component is a tachometer having a rotating shaft and a pulse generator is drivingly connected to said tachometer shaft and to this pulse generator a frequency-direct current converter for generating a direct current proportional to the pulse sequence is connected, which direct current generates in a subsequent resistance a control voltage proportional to the direct current, which voltage is supplied to a plurality of amplifiers connected in parallel and set to different switching-over threshold values for the control voltage and connected as voltage comparators, which, when switched over, each supply a fixed voltage signal to a summing amplifier connected after the amplifiers and connected to a supply voltage, the output voltage signal of which summing amplifier is applied to a comparator, which is connected to a potentiometer mechanically adjustable by the adjustment movements of the ventilation device and the output signal from which comparator is applied to an electronic switch with three-point action, which is switched on by a positive or negative voltage signal of the comparator after passing through a dead zone and governs a make time delay element, which delivers at the end of its delay period a signal which is applied to the adjustment drive.

3. Assembly according to claim 2, wherein two parallel connected groups of amplifiers connected as voltage comparators are provided, to the one group of which switch-over threshold values for town driving and to the other group of which switch-over threshold values for country driving are associated, that two summing amplifiers connected in parallel are provided, each of which is connected to the amplifiers of one group, and that the two summing amplifiers are connected to a change-over switch which can be operated as desired, and which is connected ahead of the comparator.

4. Assembly according to claim 2, wherein the amplifiers are each connected to a trim potentiometer, connected as a voltage divider and connected to a stabilised

UNITED STATES PATENT AND TRADEMARK OFFICE
CERTIFICATE OF CORRECTION

PATENT NO. : 4,278,922
DATED : July 14, 1981
INVENTOR(S) : Karl Grebe

Figure 3A:
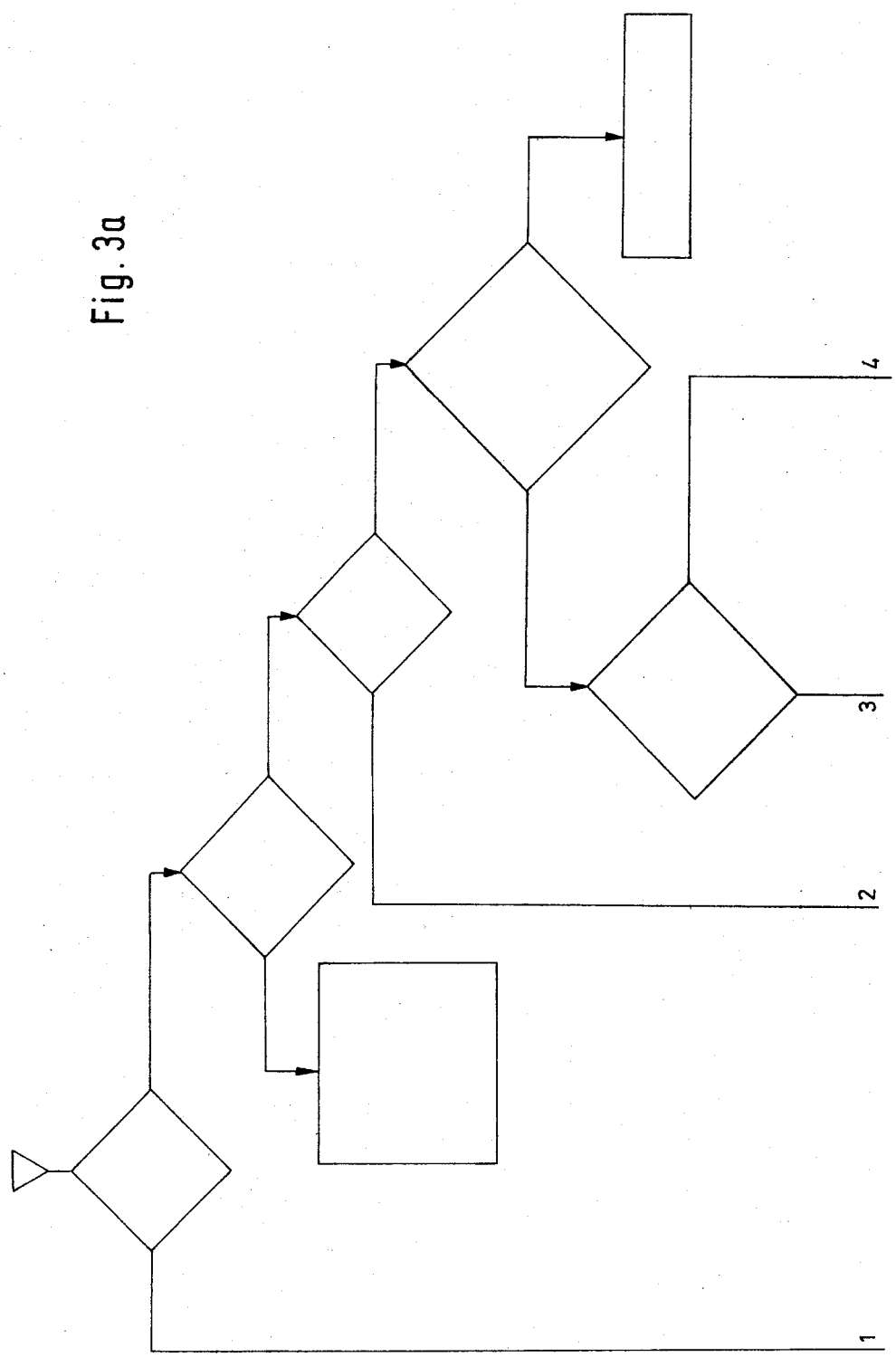
Figure 3B:
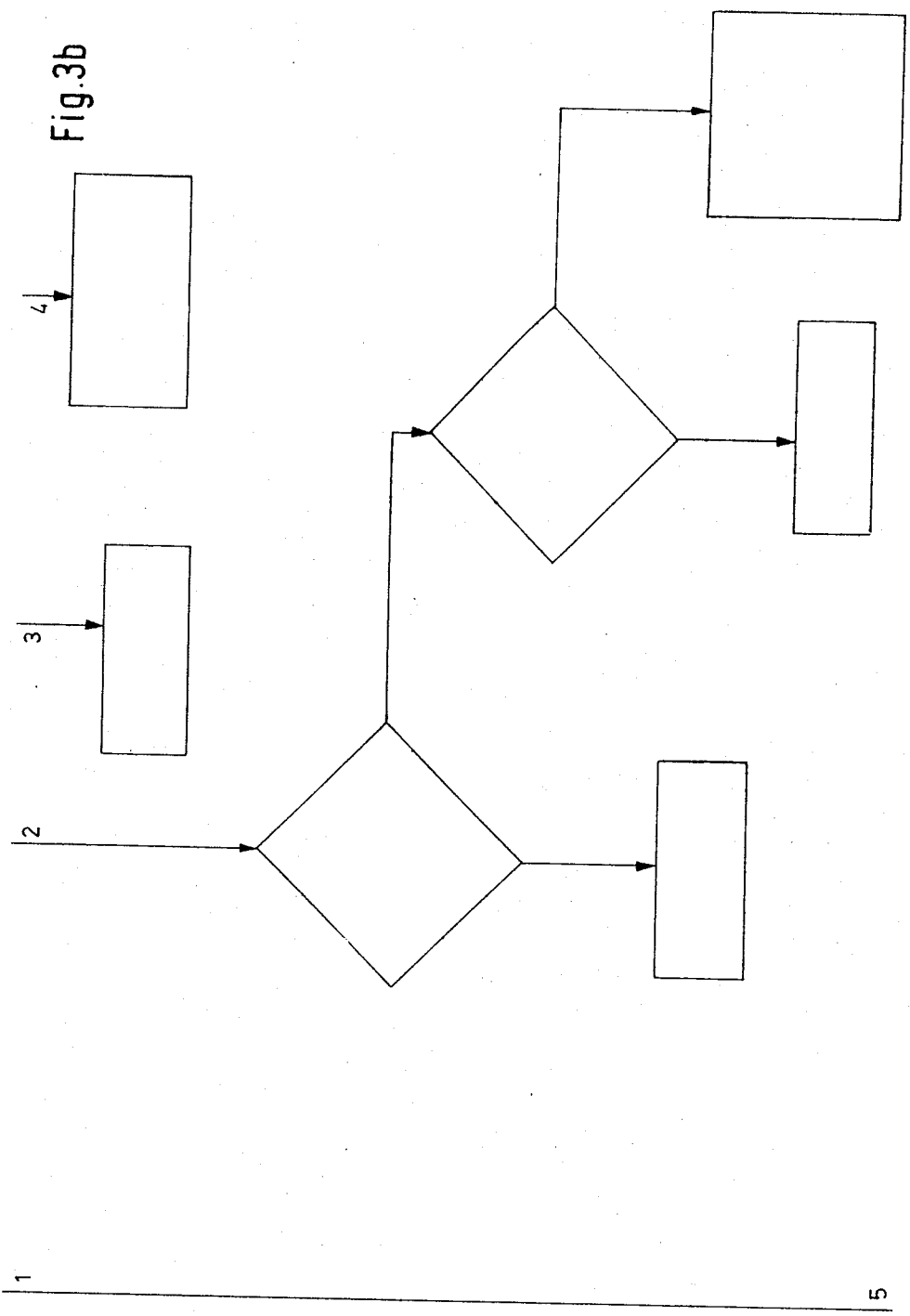
Figure 3H:
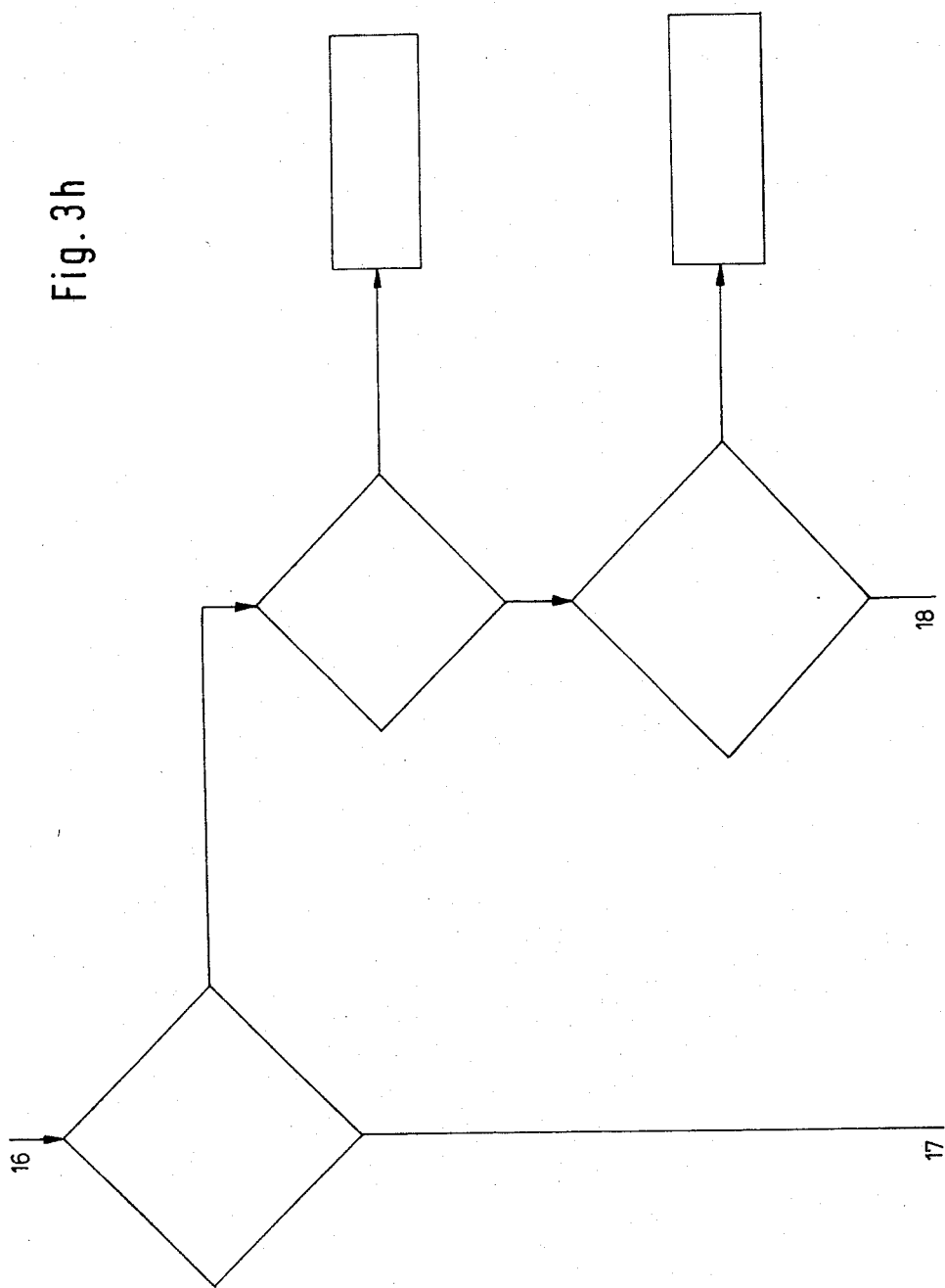
Figure 31:
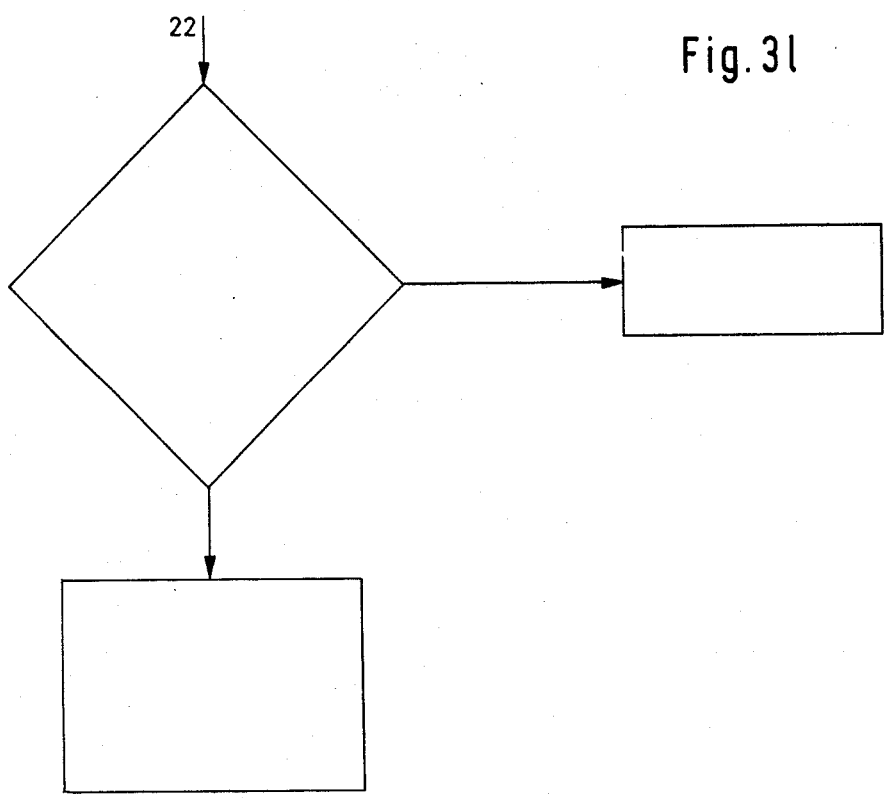

It is certified that error appears in the above-identified patent and that said Letters Patent is hereby corrected as shown below:

Figures 3a, through figure 3$\ell$ should appear as shown on the attached sheets.

Signed and Sealed this

Eighth Day of December 1981

[SEAL]

Attest:

GERALD J. MOSSINGHOFF

*Attesting Officer*     *Commissioner of Patents and Trademarks*

UNITED STATES PATENT AND TRADEMARK OFFICE
CERTIFICATE OF CORRECTION

PATENT NO. : 4,278,922

DATED : July 14, 1981

INVENTOR(S) : Karl Grebe

It is certified that error appears in the above—identified patent and that said Letters Patent is hereby corrected as shown below:

Figures 3a, through figure 3$\ell$ should appear as shown on the attached sheets.

Signed and Sealed this

Eighth Day of December 1981

[SEAL]

*Attest:*

*Attesting Officer*

GERALD J. MOSSINGHOFF

*Commissioner of Patents and Trademarks*

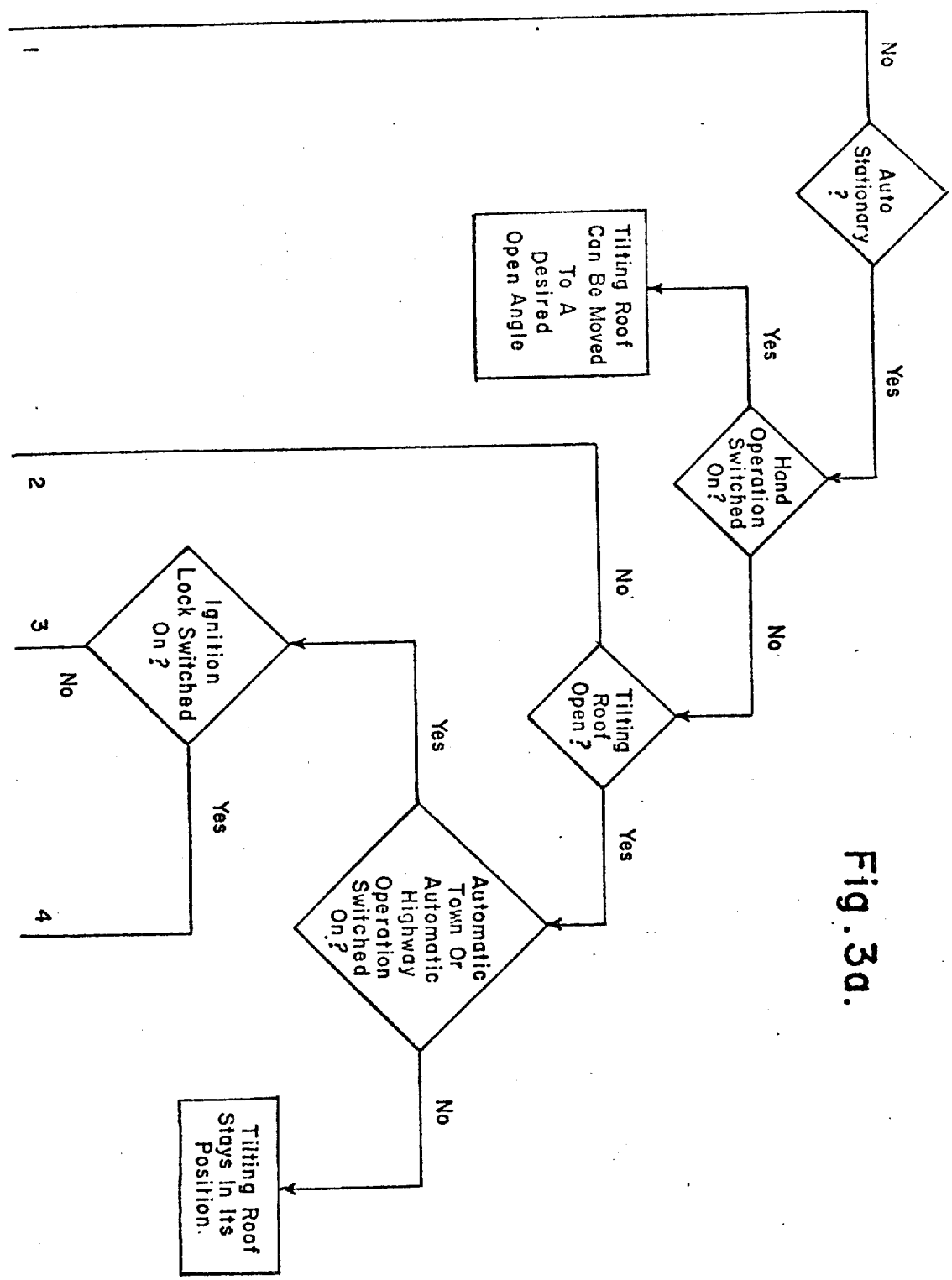

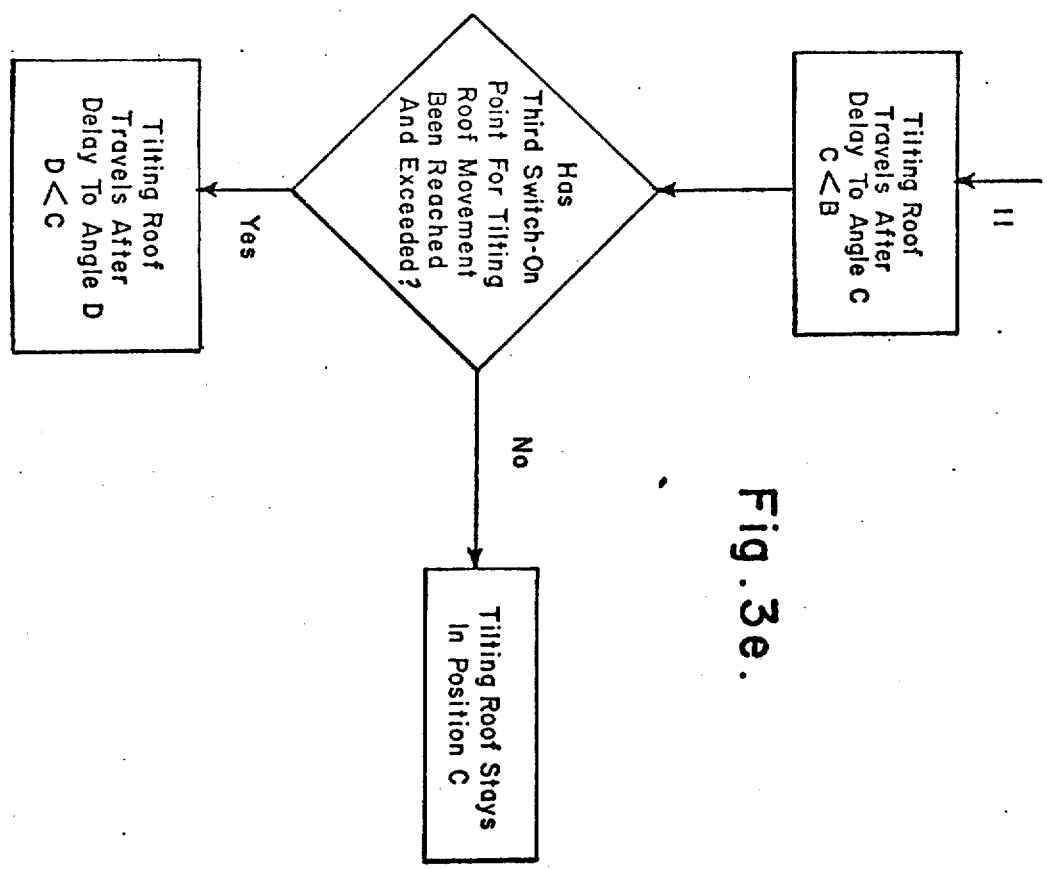

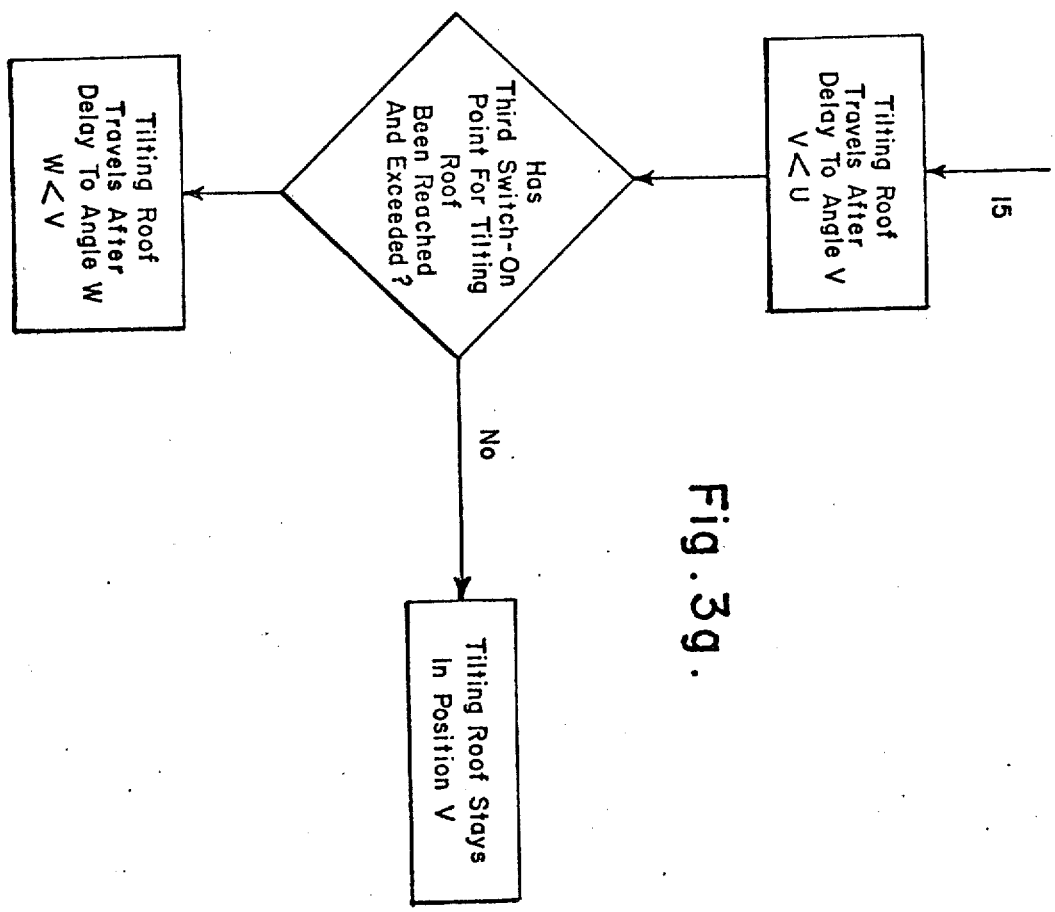

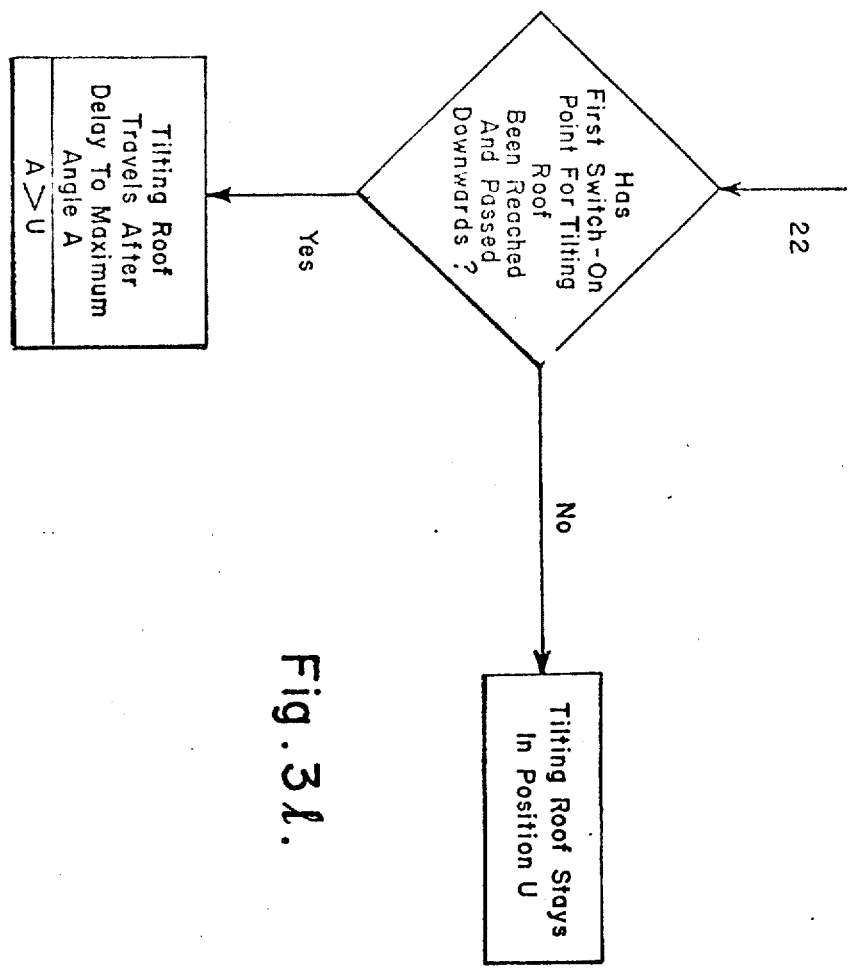
Fig. 3ℓ.